United States Patent
Kitabatake et al.

(10) Patent No.: US 9,856,418 B2
(45) Date of Patent: Jan. 2, 2018

(54) SEMICONDUCTOR PACKAGE WITH IMPROVED SIGNAL STABILITY AND METHOD OF MANUFACTURING THE SAME

(71) Applicant: SAMSUNG ELECTRONICS CO., LTD., Suwon-si, Gyeonggi-do (KR)

(72) Inventors: Takuya Kitabatake, Yokohama (JP); Fusaki Fujibayashi, Yokohama (JP); Hiroko Endo, Yokohama (JP); Masahide Yamada, Yokohama (JP); Takatoshi Seto, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 14/803,566

(22) Filed: Jul. 20, 2015

(65) Prior Publication Data

US 2016/0017222 A1 Jan. 21, 2016

(30) Foreign Application Priority Data

Jul. 18, 2014 (JP) .................................. 2014-147504
Jul. 6, 2015 (KR) ........................ 10-2015-0096053

(51) Int. Cl.
*C09K 11/08* (2006.01)
*C09K 11/59* (2006.01)
(Continued)

(52) U.S. Cl.
CPC ...... *C09K 11/7734* (2013.01); *C09K 11/7792* (2013.01)

(58) Field of Classification Search
CPC .................. C09K 11/7734; C09K 11/7792
See application file for complete search history.

(56) References Cited

U.S. PATENT DOCUMENTS 7,018,565 B2   3/2006   Tian et al.
8,937,328 B2   1/2015   Mitsuishi et al.
(Continued)

FOREIGN PATENT DOCUMENTS

CN   102660268        9/2012
JP   2007-332016 A   12/2007
(Continued)

OTHER PUBLICATIONS

Lihong Liu, et al., "Luminescence properties of a blue-emitting phosphor: $(Sr1\_Eux)Si9Al19ON31$ $(0<x<1)$", Journal of Solid State Chemistry 207 (2013) 49-54.
(Continued)

*Primary Examiner* — Carol M Koslow
(74) *Attorney, Agent, or Firm* — NSIP Law

(57) ABSTRACT

Disclosed is a phosphor including at least one of a nitride and an oxynitride, wherein the nitride and the oxynitride contain an alkaline-earth metal element, silicon, and an activator element. wherein the phosphor has a volume average particle diameter of greater than or equal to about 50 nm and less than or equal to about 400 nm and an inner quantum efficiency of greater than or equal to about 60% at an excitation wavelength of about 450 nm. The method of preparing a phosphor includes a precursor preparation process of preparing a phosphor precursor particles including a silicon nitride particles, a compound containing an alkaline-earth metal element, and a compound containing an activator element, wherein the compound containing an alkaline-earth metal element and the compound containing an activator element are deposited on the surface of the silicon nitride particles; and a firing process of firing the phosphor precursor particles.

14 Claims, 14 Drawing Sheets

(51) Int. Cl.
*H01L 33/00* (2010.01)
*C09K 11/77* (2006.01)

(56) References Cited

U.S. PATENT DOCUMENTS

| | | | |
|---|---|---|---|
| 2010/0213822 A1 | 8/2010 | Shimooka et al. | |
| 2011/0135928 A1* | 6/2011 | Ravilisetty | C04B 35/584 |
| | | | 428/402 |
| 2012/0043569 A1 | 2/2012 | Mitsuishi et al. | |

FOREIGN PATENT DOCUMENTS

| | | |
|---|---|---|
| JP | 2007314726 | 12/2007 |
| JP | 2008-95091 A | 4/2008 |
| JP | 2008-521994 A | 6/2008 |
| JP | 2009-263201 A | 11/2009 |
| JP | 4734501 | 5/2011 |
| JP | 2011515536 | 5/2011 |
| JP | 2012109531 | 6/2012 |
| KR | 1020120139041 | 12/2012 |
| WO | WO 2006/059260 A1 | 6/2006 |
| WO | WO 2012/053595 A1 | 4/2012 |

OTHER PUBLICATIONS

Japanese Office Action issued Jul. 4, 2017, in corresponding Japanese Application No. 2014-147504 (5 pages in English, 4 pages in Japanese).

\* cited by examiner

SEMICONDUCTOR PACKAGE WITH IMPROVED SIGNAL STABILITY AND METHOD OF MANUFACTURING THE SAME

RELATED APPLICATIONS

This application claims priority to Japanese Patent Application No. 2014-147504 filed in the Japanese Patent Office on Jul. 18, 2014, and Korean Patent Application No. 10-2015-0096053 filed in the Korean Intellectual Property Office on Jul. 6, 2015, and all the benefits accruing therefrom under 35 U.S.C §119, the entire contents of both applications being incorporated herein by reference.

BACKGROUND

1. Field

A phosphor and a method of preparing the same are disclosed.

2. Description of the Related Art

Recently, phosphors, which are responsible for light conversion, have been assembled in a light emitting device such as an LED or a display. For example, an LED is made as follows. A phosphor is dispersed in a silicon resin or the like and dripped on a semiconductor chip to coat the chip with the phosphor. An exemplary semiconductor chip is an InGaN-based semiconductor chip emitting blue light or near ultraviolet light, which is considered to be a promising excitation light source. In this case, color and tone are controlled by adjusting light emitted by the InGaN-based semiconductor chip and light emitted by the phosphor excited by the light emitted by the chip.

In the light emitting device, the luminescence characteristic of the phosphor is very important for the performance of the device. As the performance of the light emitting device may be improved by improving the luminescence characteristic of the phosphor responsible for the photo conversion, luminescence is very important.

At present, for the light emitting device, visible light excitation-type phosphors, such as yellow light emitting $Y_3Al_5O_{12}$:Ce and red light emitting $CaAlSiN_3$:Eu, are generally used. These phosphors are considered to have the best luminescence characteristic in a particle diameter range from several micrometers to several tens of micrometers. Accordingly, phosphor particles having an average particle diameter in this range are used. As the phosphor particles having an average particle diameter of less than about 1 micrometer (μm) have insufficient crystallinity and many defects and the activator element is insufficiently dispersed therein, luminance is significantly deteriorated. Accordingly, it is unfavorable to use such phosphors in a light emitting device such as a light or a display.

However, the phosphor particles having a size of less than about 1 μm and having high luminous efficiency are highly desirable for various applications. For example, in the conventional fluorescent lamp, phosphor particles having a size of less than about 1 μm have a much better coating property than phosphor particles having a size of about 10 μm, and the coating amount thereof is decreased so that it tends to be clearer. This is the same as in the LED light package which has been increasingly used for several years. The phosphor particles having a size of less than about 1 μm have a huge benefit of much better dispersion than the phosphor particles having a size of about 10 μm, benefits comprising a smaller addition amount, and simultaneously improved light dispersion.

The phosphor particles having a size of less than 1 μm and excited by visible light are also highly desirable for the various applications, as stated above. In this case, the phosphor excited by visible light is needed to be a phosphor of a nitrogen anion in which the crystal field split is sufficiently increased in the activator ion such as $Eu^{2+}$ or $Ce^{3+}$ and the nephelauxetic effect is sufficiently high. Accordingly, it is needed to raise the luminous efficiency of oxynitride phosphor particles having a size of less than about 1 μm or nitride phosphor particles having a size of less than about 1 μm up to the equivalent level of the phosphor for an LED, by sufficiently enhancing the effects.

In order to provide a nitride phosphor or an oxynitride phosphor containing an alkaline-earth metal element and silicon and having a small particle diameter, the following have been attempted.

For example, in Japanese Patent Laid-open Publication No. 2007-314726, a phosphor precursor powder including a mixture of phosphor raw powders having an average particle diameter of less than or equal to about 50 nm is prepared first. For example, silicon nitride powder may be used as the phosphor raw powder. The phosphor precursor powder is added with a solvent to provide a slurry. Then the slurry is added with an organic binder. The slurry added with the organic binder is then dried according to a spray drying method to provide granules having a particle diameter of less than or equal to about 2 μm. The obtained granules are fired to provide the desired phosphor.

According to the method disclosed in Japanese Patent Laid-open Publication No. 2007-314726, a precursor powder may be obtained in a fired state if firing the granules, having a particle diameter of less than or equal to about 2 μm, of the phosphor precursor powders obtained by the spray drying method. Thereby, it is difficult to synthesize phosphor particles having a small particle diameter. In addition, as an organic binder is used to provide granules having a particle diameter of less than or equal to about 2 μm, it is possible that all carbon may not be removed by the firing to deteriorate the luminescence characteristic of the phosphor. In addition, as the compound of an activator element such as Eu and the compound of an alkaline-earth metal element providing a site substituted for the activator element are separately prepared as a raw material, it is difficult to sufficiently disperse Eu in sites of alkaline-earth metal elements. As a result, the luminescence efficiency of the obtained phosphor is deteriorated.

In PCT Publication No. 2011-515536, a mixture of precursor particles including a phosphor raw material is formed. At least one of precursor particles has an average primary particle size of less than about 100 nm. The precursor particles having an average primary particle size of less than about 100 nm may include, for example, silicon nitride particles. Subsequently, the mixture is fired to provide the objective phosphor by a solid-phase reaction.

In the method disclosed in PCT Publication No. 2011-515536, the phosphor obtained by firing the mixture of precursor particles is a deposited material of silicon nitride particles or silicon oxynitride particles. Thereby, it is difficult to synthesize phosphor particles having a small particle diameter due to solidification among primary particles or the like. In addition, like the case of Japanese Patent Laid-open Publication No. 2007-314726, as the compound of the activator element and the compound of the alkaline-earth metal element are separately prepared, Eu is insufficiently dispersed until the particle size reached a sub-micron size, so that the luminescence efficiency is deteriorated.

SUMMARY

As described above, the phosphor particles having a size of less than about 1 μm, required for the reduced amount of phosphor used for a high performance light emitting device, had insufficient luminescence efficiency when formed according to the conventional method, so that the luminescence efficiency thereof has not approached the level of the phosphor having a particle diameter of several micrometers to several tens of micrometers.

Thereby, an embodiment is to provide a phosphor having a high luminescence efficiency, of itself, and simultaneously, having an average particle diameter of less than about 1 μm, and including at least one of nitride and oxynitride wherein the nitride and oxynitride include an alkaline-earth metal element and silicon. Also disclosed is a method of preparing the same.

The present Inventors had repeatedly researched, and found that a phosphor including at least one of nitride and oxynitride, wherein the nitride and oxynitride containing an alkaline-earth metal element and silicon, has an excellent luminescence characteristic and a small particle diameter and may be obtained from particulate-type phosphor precursor particles in which an alkaline-earth metal element and an activator element are finely deposited on the surface of silicon nitride particulate according to a wet chemical method.

The present invention is made by this knowledge and has the following Embodiments.

Embodiment 1

A phosphor including at least one of a nitride and a oxynitride, wherein the nitride and the oxynitride include an alkaline-earth metal element, silicon, and an activator element, and further wherein the phosphor has a volume average particle diameter of greater than or equal to about 50 nm and less than or equal to about 400 nm and an inner quantum efficiency of greater than or equal to about 60% at an excitation wavelength of about 450 nm.

Embodiment 2

The phosphor of Embodiment 1, wherein the phosphor is represented by a formula of $MSi_2O_2N_2$; the oxynitride has a crystal structure of $SrSi_2O_2N_2$; and the element M includes at least one alkaline-earth metal element including at least Sr and an additional alkaline-earth metal element selected from Ca, Ba and Mg, and at least one activator element including Eu or a combination of Eu and Ce; and wherein the oxynitride includes Sr in greater than or equal to about 15 mol % and less than or equal to about 99 mol % and the activator element in greater than or equal to about 1 mol % and less than or equal to about 20 mol % based on the total amount of the element M.

Embodiment 3

The phosphor of Embodiment 1 or Embodiment 2, having a volume average particle size distribution index of greater than or equal to about 1.20 and less than or equal to about 1.35.

Embodiment 4

The phosphor of Embodiment 2 or Embodiment 3 including a silicon-containing compound having a different crystal structure from the oxynitride, wherein the oxynitride is included in greater than or equal to about 50 mass % based on the total amount of the oxynitride and the silicon-containing compound.

Embodiment 5

A method of preparing a phosphor including at least one of a nitride and oxynitride, wherein the nitride and oxynitride include an alkaline-earth metal element, silicon, and an activator element, includes:

a precursor preparation process of preparing phosphor precursor particles having a volume average particle diameter of less than or equal to about 250 nanometers (nm) and including a silicon nitride particles and a compound containing an alkaline-earth metal element and a compound containing an activator element which are deposited on the surface of the silicon nitride particles, and a firing process of firing the phosphor precursor particles.

Embodiment 6

The method of Embodiment 5, wherein the precursor preparation process includes a precursor forming process of subjecting a suspension including silicon nitride particles, a material containing an alkaline-earth metal element and a material containing an activator element to a wet chemical method to provide phosphor precursor particles in which a compound including the alkaline-earth metal element and a compound including the activator element are mixed and deposited on the surface of the silicon nitride particles.

Embodiment 7

The method of Embodiment 5, wherein the phosphor precursor particles includes silicon nitride particles, a compound containing at least one the alkaline-earth metal element including at least Sr and an additional alkaline-earth metal element selected from Ca, Ba and Mg and a compound containing at least one activator element comprising Eu or a combination of Eu and Ce, and further wherein the at least one alkaline earth element and the at least one activator element are deposited on the surface of the silicon nitride particles, and the mole ratio of the total amount of the alkaline-earth metal element and the activator element to the silicon is from about 1:1.4 to about 1:2.86, and wherein the phosphor precursor panicles include Sr in greater Man or equal to about 15 mol % and less than or equal to about 99 mot % and the activator element in greater than or equal to about 1 mol % and Ins than or equal to about 20 mol % based on the total amount of the alkaline earth metal element and the activator element.

Embodiment 8

The method of Embodiment 7, wherein the precursor preparation process including a suspension forming process of providing a suspension including silicon nitride particles and a material including at least one alkaline-earth metal element including at least Sr and an optional alkaline-earth metal element selected from Ca, Ba, and Mg, and a material including at least one activator element comprising Eu or a combination of Eu and Ce and a mole ratio of the total amount of the alkaline-earth metal element and the activator element to the silicon in a range of about 1:1.4 to about 1:2.86; and a precursor forming process of subjecting the suspension to a wet chemical method to precipitate a compound containing the alkaline-earth metal element and a compound containing the activator element and forming a phosphor precursor particles in which the compound containing the alkaline-earth metal element and the compound containing the activator element are mixed to each other and deposited on the surface of the silicon nitride particles, wherein the suspension includes Sr in greater than or equal to about 15 mol % and less than or equal to about 99 mol % and the activator element in greater than or equal to about 1 mol % and less than or equal to about 20 mol % based on the total amount of the alkaline earth metal element and the activator element.

Embodiment 9

The method of Embodiment 6 or Embodiment 8, wherein the wet chemical method is at least one of a co-precipitation method and a citrate process.

Embodiment 10

The method of Embodiment 9, wherein the wet chemical method is a co-precipitation method.

Embodiment 11

The method of any one of Embodiments 5 to Embodiment 10, wherein each of the compound containing the alkaline-earth metal element and the compound containing the activator element includes at least one compound selected from a carbonate, a hydrogen carbonate, a phosphate, a carboxylate, an oxalate, a sulfate, an organometallic compound, and a hydroxide.

Embodiment 12

The method of Embodiment 11, wherein each of the compound containing the alkaline-earth metal element and the compound containing the activator element includes at least one compounds selected from carbonate and hydroxide.

Embodiment 13

The method of any one of Embodiment 5 to Embodiment 12, wherein the silicon nitride particles have a volume average particle diameter of less than or equal to about 150 nm.

Embodiment 14

The method of any one of Embodiment 5 to Embodiment 13, wherein the silicon nitride particles are amorphous.

Embodiment 15

The method of any one of Embodiment 5 to Embodiment 14, wherein the firing process is performed at a temperature of greater than or equal to about 1150° C. and less than or equal to about 1650° C. under a mixed gas atmosphere of hydrogen and nitrogen or a mixed gas atmosphere of ammonia and nitrogen.

As described above, according to the embodiments, the phosphor, including at least one of a nitride and oxynitride, wherein the nitride and oxynitride include an alkali earth metal element, silicon, and an activator element, has a volume average particle diameter of greater than or equal to about 50 nm and less than or equal to about 400 nm and an inner quantum efficiency of greater than or equal to about 60% at an excitation wavelength of about 450 nm.

Therefore, the obtained phosphor, including at least one of a nitride and oxynitride, wherein the nitride and oxynitride contain an alkaline-earth metal element, silicon, and an activator element, may have an excellent luminescence property and a small particle diameter.

In addition, according to the present invention, the method of preparing a phosphor, including at least one of nitride and oxynitride, wherein the nitride and oxynitride contain an alkaline-earth metal element, silicon and an activator element, includes: preparing a phosphor precursor particles having a volume average particle diameter of less than or equal to about 250 nm and including silicon nitride particles and a compound containing an alkaline earth metal element and a compound containing an activator element which are deposited on the surface of the silicon nitride particles; and firing the phosphor precursor particles.

In the phosphor precursor particles, the compound containing an alkaline-earth metal element and the compound containing an activator element are deposited on the surface of the silicon nitride particles. Thereby, during the firing process, the silicon ion and the alkaline-earth metal ion, and the ion of activator element easily carry out a cation exchange. Accordingly, the synthesizing nitride or oxynitride may be completed to the objective composition by only a little particle growth. Thus the phosphor, including at least one of nitride and oxynitride as described above, may have an excellent luminescence characteristic and a small particle diameter.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
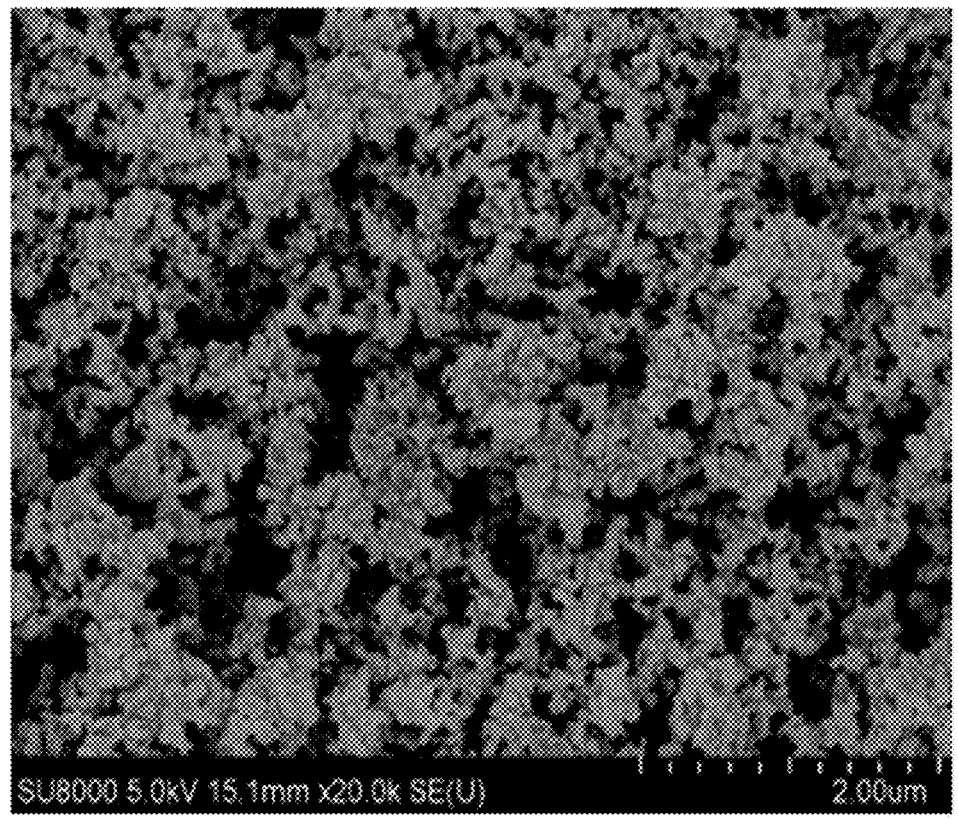
FIG. 1 is a scanning electron microscopic (SEM) image showing phosphor precursor particles.

Exemplary embodiments of the present inventive concept will hereinafter be described in detail, and may be easily performed by those who have common knowledge in the related art. However, this disclosure may be embodied in many different forms and is not construed as limited to the exemplary embodiments set forth herein. Rather, these embodiments are provided so that this disclosure will fully convey the scope of the disclosure to those skilled in the art. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. Unless otherwise defined, all terms used in the specification (comprising technical and scientific terms) may be used with meanings commonly understood by a person having ordinary knowledge in the art to which this invention belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "comprising", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As stated above, unless specifically described to the contrary, a singular form includes a plural form.

Hereinafter, exemplary embodiments are described.

A. Phosphor

According to an embodiment, the obtained phosphor includes at least one of a nitride and an oxynitride. The nitride and oxynitride contain an alkaline-earth metal element, silicon, and an element functioning as an activator (hereinafter referred to as 'activator element').

The phosphor may include only a nitride or may include only an oxynitride. In addition, it may include both a nitride and an oxynitride. Furthermore, besides the nitride and oxynitride, the phosphor may include impurities to an extent to not negatively influence the luminescence characteristics of a phosphor.

The alkaline-earth metal element, which may be contained in the nitride or oxynitride, may include calcium (Ca), strontium (Sr), barium (Ba), or magnesium (Mg).

The nitride or oxynitride contains an activator element to improve the luminescence characteristics of the phosphor. The activator element may be, for example, europium (Eu), cerium (Ce), manganese (Mn), praseodymium (Pr), neodymium (Nd), samarium (Sm), terbium (Tb), dysprosium (Dy), holmium (Ho), erbium (Er), thulium (Tm), or ytterbium (Yb).

The nitride included in the phosphor according to the present invention may be, for example, an $M_2Si_5N_8$-based nitride (M is an alkaline-earth metal element, or an alkaline-earth metal element and an activator element).

The oxynitride included in the phosphor according to the present invention may be, for example, an $MSi_2O_2N_2$-based oxynitride (M is an alkaline-earth metal element, or an alkaline-earth metal element and an activator element), or an $M_2(Si, Al)_5(N,O)_8$-based oxynitride (M is an alkaline-earth metal element, or an alkaline-earth metal element and an activator element).

B. Method of Preparing Phosphor

The phosphor, including at least one of a nitride and an oxynitride containing an alkaline-earth metal element and silicon according to an embodiment, may be obtained by preparing phosphor precursor particles and firing the phosphor precursor particles.

Hereinafter, each process is described in detail.

1. Precursor Preparation Process

As raw materials, silicon nitride particles and a material containing an alkaline-earth metal element are used. In addition, a material including an activator element is used for improving luminescence characteristics of a phosphor.

The silicon nitride particles used as a raw material may be amorphous. When the raw material is amorphous silicon nitride particles, cation exchange of a silicon ion with an alkaline-earth metal ion or an ion of the activator element, in the compound containing an alkaline-earth metal element and the compound containing an activator element which are deposited on the surface of the silicon nitride, may easily occur during the firing.

In addition, the silicon nitride particles used as a raw material may have a volume average particle diameter of less than or equal to about 150 nm, for example, less than or equal to about 120 nm. When using silicon nitride particles having a volume average particle diameter of less than or equal to about 150 nm as a raw material, phosphor precursor particles having a small particle diameter may be obtained, and resultantly, a phosphor having a small particle diameter may be obtained. In addition, when using silicon nitride particles having a volume average particle diameter of less than or equal to about 150 nm as a raw material, it may obtain a phosphor having a uniform particle diameter capable of controlling a particle-size distribution.

For the material containing an alkaline-earth metal element as a raw material, a Ca-containing material may be, for example, calcium oxide, calcium hydroxide, calcium carbonate, calcium nitrate tetrahydrate, calcium sulfate dihydrate, calcium oxalate hydrate, calcium acetate hydrate, calcium chloride, calcium fluoride, calcium nitride, calcium imine, or calcium amide. In an exemplary embodiment, calcium nitrate tetrahydrate and calcium chloride may be used.

A Sr-containing material may be, for example, strontium oxide, strontium hydroxide octahydrate, strontium carbonate, strontium nitrate, strontium sulfate, strontium oxalate hydrate, strontium acetate hemihydrate, strontium chloride, strontium fluoride, strontium nitride, strontium imine, or strontium amide. In an example embodiment, strontium nitrate and strontium chloride may be used.

A Ba-containing material may be, for example, barium oxide, barium hydroxide 8 hydrate, barium carbonate, barium nitrate, barium sulfate, barium oxalate, barium acetate, barium chloride, barium fluoride, barium nitride, barium imine, or barium amide. In an exemplary embodiment, barium nitrate and barium chloride may be used.

An Mg-containing material may be, for example, magnesium oxide, magnesium hydroxide, basic magnesium carbonate, magnesium nitrate hexahydrate, magnesium sulfate, oxalic acid magnesium dihydrate, acetic acid magnesium tetrahydrate, magnesium chloride, magnesium fluoride, magnesium nitride, magnesium imine, or magnesium amide. In an exemplary embodiment, magnesium nitrate and magnesium chloride may be used.

For the material containing an activator element as a raw material, an Eu-containing material may be, for example, europium oxide, europium sulfate, oxalic acid europium decahydrate, europium(II) chloride, europium(III) chloride, europium(II) fluoride, europium(III) fluoride, europium nitrate hexahydrate, europium nitride, europium imine, or europium amide. In an exemplary embodiment, europium nitrate hexahydrate, europium oxide, and europium(II) chloride may be used.

Other materials containing an activator element of Ce, Mn, Pr, Nd, Sm, Tb, Dy, Ho, Er, Tm, and Yb may include compounds substituting Eu with Ce, Mn, Pr, Nd, Sm, Tb, Dy, Ho, Er, Tm, and Yb, respectively, from the specific compound examples of the Eu-containing materials.

The precursor preparation process includes preparing phosphor precursor particles including silicon nitride particles, a compound containing an alkaline-earth metal element deposited on the surface of silicon nitride particles, and a compound containing an activator element deposited on the surface of silicon nitride particles, wherein the phosphor precursor particles have a volume average particle diameter of less than or equal to about 250 nm, for example, less than or equal to about 210 nm.

For example, in order to obtain an $MSi_2O_2N_2$-based oxynitride (M includes at least one kind of an alkaline-earth metal element including at last Sr and an optional-additional alkaline-earth metal element selected from Ca, Ba and Mg, and at least one kind of activator element including Eu or a combination of Eu and Ce; and includes the Sr at greater than or equal to about 15 mol % and less then or equal to about 99 mol %, for example, greater than or equal to about 20 mol % and less than or equal to about 95 mol %, and the activator element at greater than or equal to about 1 mol % and less than or equal to about 20 mol %, for example, greater than or equal to about 6 mol % and less than or equal to about 16 mol %, based on the total amount of element M), the procurator preparation process prepares phosphor precursor particles including silicon nitride particles, a compound containing at least one kind of an alkaline-earth metal element including at least Sr and an optional-additional alkaline-earth metal element selected from Ca, Ba, and Mg, and deposited on the surface of the silicon nitride particles, and a compound containing at least one kind of an activator element including at least Eu or a combination of Eu and Ce, end having a volume average particle diameter of less than or equal to about 250 nm, for example, lees than or equal to about 210 nm.

The phosphor precursor particles include silicon nitride particles, a compound containing an alkaline-earth metal element, and a compound containing an activator element in a mole ratio range of the total amount of the alkaline-earth metal element and the activator element to the silicon of about 1:1.4 to about 1:2.86, for example, in a range of about 1:1.5 to about 1:2.67.

Furthermore, the phosphor precursor particles comprise Sr at greater than or equal to about 15 mol % and less than or equal to about 99 mol %, for example greater than or equal to about 20 mol % and less than or equal to about 95 mol %, and an activator element at greater than or equal to about 1 mol % and less than or equal to about 20 mol %, for example greater than or equal to about 5 mol % and less than or equal to about 15 mol %, based on the total amount of the alkaline-earth metal element and the activator element.

The precursor preparation process includes a suspension forming process and a precursor forming process.

Suspension Forming Process

In order to obtain a nitride or an oxynitride containing an alkaline-earth metal element and silicon in the objective composition, a suspension including silicon nitride particles, a material containing an alkaline-earth metal element, and a material containing an activator element as raw materials in a predetermined ratio, is formed.

For example, in order to obtain the $MSi_2O_2N_2$-based oxynitride, a suspension including silicon nitride particles, a material containing an alkaline-earth metal element and a material containing an activator element in a mole ratio range of the total amount of the alkaline-earth metal element and the activator element to the silicon of about 1:1.4 to about 1:2.86, for example, in a range of about 1:1.5 to about 1:2.67, is formed. Out of the range, the phosphor yield is deteriorated, so that the cost is increased.

In addition, the suspension includes Sr at greater than or equal to about 15 mol % and less than or equal to about 99 mol %, for example greater than or equal to about 20 mol % and less than or equal to about 95 mol %, and an activator element at greater than or equal to about 1 mol % and less than or equal to about 20 mol %, for example greater than or equal to about 5 mol % and less than or equal to about 15 mol %, based on the total amount of element M.

The suspension is formed by inputting a raw material into a solvent and agitating the same.

The solvent for providing the suspension may include, for example, a mixed solvent of water and at least one kind of polyhydric alcohol selected from ethylene glycol, propylene glycol, tetramethylene glycol, heptamethylene glycol, hexamethylene glycol, glycerine, and sorbitol. Among them, a mixed solvent of water and ethylene glycol may be used.

Precursor Forming Process

The suspension is subjected to a wet chemical method to provide phosphor precursor particles having a volume average particle diameter of less than or equal to about 250 nm, for example, less than or equal to about 210 nm, in which the compound containing an alkaline-earth metal element and the compound containing an activator element are mixed with each other and deposited on the surface of the silicon nitride.

For example, in order to obtain an $MSi_2O_2N_2$-based oxynitride, the suspension is subjected to a wet chemical method to precipitate a compound containing an alkaline-earth metal element and a compound containing an activator element; and to provide phosphor precursor particles having a volume average particle diameter of less than or equal to about 250 nm, for example, less than or equal to about 210 nm, in which the compound containing an alkaline-earth metal element and the compound containing an activator element are mixed with each other and deposited on the surface of the silicon nitride.

The phosphor precursor particles include silicon nitride particles, a compound containing an alkaline-earth metal element and a compound containing an activator element in a mole ratio range of the total amount of the alkaline-earth metal element and the activator element and the silicon of about 1:1.4 to about 1:2.86, more specifically, in a range of about 1:1.5 to about 1:2.67. Out of the range, the phosphor yield is deteriorated, so that the cost is increased.

In addition, the phosphor precursor particles include Sr at greater than or equal to about 15 mol % and less than or equal to about 99 mol %, for example greater than or equal to about 20 mol % and less than or equal to about 95 mol %, and an activator element at greater than or equal to about 1 mol % and less than or equal to about 20 mol %, for example greater than or equal to about 5 mol % and less than or equal to about 15 mol %, based on the total amount of the alkaline-earth metal element and the activator element.

When the phosphor precursor particles have a volume average particle diameter of less than or equal to about 250 nm, the obtained phosphor may have a small particle diameter. In addition, when the phosphor precursor particles have a volume average particle diameter of less than or equal to about 250 nm, the obtained phosphor may have a uniform particle diameter capable of controlling a particle-size distribution.

By subjecting the suspension to a wet chemical method, the compound containing an alkaline-earth metal element and the compound containing an activator element are mixed with each other and deposited on the surface of the silicon nitride particles. Thereby, on the firing, the cation exchange of the silicon ion with the alkaline-earth metal ion or the ion of the activator element may be easily performed. Accordingly, the synthesis reaction of the nitride or oxynitride having the objective composition may be completed even by a little particle growth.

The wet chemical method may include any method as long as the compound containing an alkaline-earth metal element and the compound containing an activator element may be mixed with each other and deposited on the surface of the silicon nitride particles. For example, it may include a co-precipitation method and a citrate process. As the wet chemical method, only the co-precipitation method may be used, or only the citrate method may be used. On the other hand, both the co-precipitation and the citrate method may be used.

When the co-precipitation method or the citrate process is used as the wet chemical method, the compound containing an alkaline-earth metal element and the compound containing an activator element may be easily precipitated, and it may easily catch and make contact with the silicon nitride particle. Thereby, on the firing, the cation exchange of the silicon ion with the alkaline-earth metal ion or the ion of the activator element is easily performed. Accordingly, the synthesis reaction of the nitride or oxynitride having the objective composition may be completed even by a little particle growth.

The co-precipitation method may be performed by adding a co-precipitation agent into the suspension. The co-precipitation agent added to the suspension may be, for example, an ammonium hydrogen carbonate aqueous solution, an ammonium carbonate aqueous solution, a urea aqueous solution, an acetamide aqueous solution, a thiourea aqueous solution, or a thioacetamide aqueous solution. Among them, the ammonium hydrogen carbonate aqueous solution and the ammonium carbonate aqueous solution may be used.

The citrate process is performed by adding citric acid into the suspension.

The compound containing an alkaline-earth metal element and the compound containing an activator element, which are deposited on the surface of the silicon nitride, may each include any compound as long as it is at least one kind of compounds selected from a carbonate, a hydrogen carbonate, a phosphate, a carboxylate salt, an oxalate, a sulfate, an organometallic compound, and a hydroxide. For example, it may include at least one kind of compounds selected from a carbonate salt and a hydroxide. The carbonate or the hydroxide may be easily precipitated according to the co-precipitation method or the citrate process.

The phosphor precursor particles included in the suspension are recovered using, for example, a centrifuge.

2. Firing Process

The obtained phosphor precursor particles are fired. The firing is performed under the firing conditions to obtain the phosphor including the nitride or oxynitride containing an alkaline-earth metal element, silicon, and an activator element in the objective composition, which has an excellent luminescence characteristic and a small particle diameter.

For example, in order to obtain the $MSi_2O_2N_2$-based oxynitride, the phosphor precursor particles are fired under a mixed gas atmosphere of hydrogen and nitrogen or a mixed gas atmosphere of ammonia and nitrogen at a temperature of greater than or equal to about 1150° C. and less than or equal to about 1650° C., for example, greater than or equal to about 1200° C. and less than or equal to about 1600° C.

By firing the phosphor precursor particles under the mixed gas atmosphere of hydrogen and nitrogen or the mixed gas atmosphere of ammonia and nitrogen, the phosphor including a main component of $MSi_2O_2N_2$-based oxynitride in the objective composition may be obtained. The obtained phosphor may have an excellent luminescence characteristic by including a main component of the $MSi_2O_2N_2$-based oxynitride in the objective composition.

In addition, by firing at a temperature of greater than or equal to about 1150° C., it may prevent the $MSi_2O_2N_2$-based oxynitride in the objective composition from insufficient firing and may prevent the generation of an impurity other than the $MSi_2O_2N_2$-based oxynitride in the objective composition. Since it may prevent the insufficient firing or the impurity generation, the obtained phosphor may have excellent luminescence characteristics.

In addition, by firing at a temperature of less than or equal to about 1650° C., it may prevent the particles from excessively growing and may prevent the $MSi_2O_2N_2$-based oxynitride in the objective composition from being fused.

Since the excessive particle growth is prevented, the obtained phosphor may have a small particle diameter. In addition, as the fusing $MSi_2O_2N_2$-based oxynitride in the objective composition is prevented, the phosphor including the $MSi_2O_2N_2$-based oxynitride in the objective composition may be easily prepared.

The firing may be performed, for example, according to the following order.

First, the obtained phosphor precursor particles are charged in a heat resistant container made of a material having low reactivity. The heat resistance container may include, for example, a crucible or a tray. The material for the heat resistant container may include a main component of, for example, ceramics such as mullite, alumina, boron nitride, silicon nitride, silicon carbide, a metal such as magnesium, rhodium, platinum, molybdenum, tungsten, tantalum, niobium, iridium, and the like, or an alloy thereof, or carbon (graphite). Desirably, it may include a heat-resistant container made of boron nitride, alumina, silicon nitride, silicon carbide, platinum, molybdenum, tungsten, or tantalum.

Then the heat resistant container charged with the phosphor precursor particles is introduced into a firing device. The firing device may include, for example, a metal furnace or a carbon furnace.

Subsequently, the firing device with the heat resistant container is placed under reduced pressure such as a vacuum. The inside temperature of the firing device is then increased to a firing/calcination temperature. In order to provide the phosphor, including the nitride or oxynitride containing an alkaline-earth metal element, silicon, and an activator element in the objective composition with an excellent luminescence characteristic and a small particle diameter, a predetermined gas is then introduced into the firing device, and the pressure in the firing device is returned to atmospheric pressure. For example, in order to provide the $MSi_2O_2N_2$-based oxynitride, a mixed gas of hydrogen and nitrogen or a mixed gas of ammonia and nitrogen is introduced into the firing device. In order to provide the phosphor including the nitride or oxynitride containing an alkaline-earth metal element, silicon, and an activator element in the objective composition with an excellent luminescence characteristic and a small particle diameter, the inside of the firing device is then increased to the predetermined firing temperature and maintained for a predetermined time. For example, in order to obtain the $MSi_2O_2N_2$-based oxynitride, the temperature is increased to a firing temperature of greater than or equal to about 1150° C. and less than or equal to about 1650° C., and more specifically, to greater than or equal to about 1200° C. and less than or equal to about 1600° C.

C. Phosphor

The phosphor, including at least one of the nitride and oxynitride containing an alkaline-earth metal element, silicon, and an activator element and obtained by the preparation method, has a volume average particle diameter of greater than or equal to about 50 nm and less than or equal to about 400 nm, for example, greater than or equal to about 100 nm and less than or equal to about 350 nm, and has inner quantum efficiency of greater than or equal to about 60%, for example, greater than or equal to about 70%, at an excitation wavelength of about 450 nm. Thereby, the phosphor has an excellent luminescence characteristic and a small particle diameter.

For example, the phosphor, including the oxynitride containing an alkaline-earth metal element and an activator element and silicon, which is obtained by the above method for obtaining the $MSi_2O_2N_2$-based oxynitride, is represented by a formula of $MSi_2O_2N_2$ (M includes at least one kind of an alkaline-earth metal element including at least Sr and an optional-alkaline-earth metal element selected from Ca, Ba, and Mg, and at least one hind of activator element including at least Eu or a combination of Eu and Ce, and includes Sr at greater than or equal to about 15 mol % and less than or equal to about 99 mol %, for example, greater man or equal to about 20 mol % and less than or equal to about 95 mol %, and an activator element at greater than or equal to about 1 mol % and less than or equal to about 20 mol %, for example, greater than or equal to about 5 mol % and less than or equal to about 15 mol %, based on the total amount of the element M), and the oxynitride has a crystal structure such as $SrSi_2O_2N_2$.

The phosphor has a volume average particle diameter of greater than or equal to about 50 nm and less than or equal to about 400 nm, for example, greater than or equal to about 100 nm and less than or equal to about 350 nm, and has inner quantum efficiency of greater than or equal to about 60%, for example, greater than or equal to about 70%, at an excitation wavelength of about 450 nm. Thereby, the phosphor has an excellent luminescence characteristic and a small particle diameter.

In addition, as the phosphor includes Sr at greater than or equal to about 15 mol % based on the total amount of element M, it may prevent the decrease of the fusing point of the $MSi_2O_2N_2$-based oxynitride in the objective composition. Thereby, the phosphor including the $MSi_2O_2N_2$-based oxynitride in the objective composition may be easily prepared.

In addition, as the phosphor includes Sr at less than or equal to about 99 mol % based on the total amount of the element M, it may prevent the decrease of the content of the activator element. Thus, the obtained phosphor may have an excellent luminescence characteristic.

In addition, as the phosphor includes an activator element at greater than or equal to about 1 mol % based on the total amount of the element M, it may ensure the content of the activator element. Thus the obtained phosphor may have an excellent luminescence characteristic.

In addition, as the phosphor includes an activator element at less than or equal to about 20 mol % based on the total amount of the element M, it may prevent concentration quenching. Thus, the obtained phosphor may have an excellent luminescence characteristic.

In addition, the phosphor obtained from the preparation method has a volume average particle-size distribution index of greater than or equal to about 1.20 and less than or equal to about 1.35, and for example, greater than or equal to about 1.21 and less than or equal to about 1.32. When the volume average particle-size distribution index is greater than or equal to about 1.20 and less than or equal to about 1.35, the obtained phosphor may have a uniform particle diameter.

In addition, when the phosphor obtained from the preparation method includes a silicon-containing compound having the different crystal structure from the oxynitride in the objective composition, it may include the oxynitride in the objective composition at greater than or equal to 50 mass %, for example 70 mass %, based on the total amount of the oxynitride and the silicon-containing compound. By including the oxynitride in the objective composition at greater than or equal to about 50 mass %, the $MSi_2O_2N_2$-based oxynitride in the objective composition becomes a main component. Therefore, the obtained phosphor may have an excellent luminescence characteristic.

D. Use of Phosphor

The phosphor obtained from this disclosure may be applied in a light conversion device such as a, LED light, a display, and the like. In addition, as the phosphor is fine particles having a particle diameter of less than or equal to about 400 nm, it may be substituted for the conventional pigment.

Hereinafter, this disclosure is specifically described with reference to examples.

In the examples and comparative examples, the various measurements and analyses are performed as follows.

Measurement of Particle-Size Distribution

In the examples and comparative examples, the particle-size distribution of particles is measured using ELS-Z1000ZS (manufactured by Otsuka Electronics). For the measurement, the specimen is dispersed in ethanol or water and undergoes ultrasonic wave treatment for greater than or equal to about 30 seconds to provide a sample for measurement.

With reference to the measured particle-size distribution of particles, the volume taken by the particles included in the divided particle range is accumulated from the smallest particle diameter: so D16V is defined as a particle diameter accumulated at 16%; D50V refers to the particle diameter accumulated at 50%; and D84V refers to the particle diameter accumulated at 84%. In this case, D50V is defined as a volume average particle diameter, and D84V/D16V is defined as a volume average particle-size distribution index (PSDV).

In addition, based on the measured particle-size distribution of particles, the number of particles included in the divided particle-size range is accumulated from the smallest one, so the particle diameter accumulated at 50% is defined a numeral average particle diameter.

Measurement of Excitation Luminescence Spectrum

In the examples and comparative examples, an excitation luminescence spectrum is measured using a spectrophotofluorometer F-7000 (manufactured by Hitachi High-Technologies).

Measurement of Inner Quantum Efficiency

In the examples, the inner quantum efficiency is measured using an absolute PL quantum yield measurement system (manufactured by Hamamatsu Photonics K.K.).

For the measurement, 0.1 g of the specimen is used. The measurement is performed at an excitation wavelength of about 450 nm.

Observation by Scanning Electron Microscope

In the examples, the particles are observed using a scanning electron microscope (SEM) SU8020 (manufactured by Hitachi High-Technologies).

Metal Element Analysis

In the examples and comparative examples, the metal element is analyzed using ICP-MS (manufactured by Agilent Technologies Japan, Ltd.) and ICP-AES (manufactured by Shimadzu Corporation).

For analyzing the metal element, the specimen is alkali-fused using a solvent (borax:sodium carbonate=1:1) and added with hydrochloric acid to provide a volume-constant sample for the measurement.

Europium is analyzed by ICP-MS (manufactured by Agilent Technologies Japan, Ltd.), and the other metal elements are measured by ICP-AES (manufactured by Shimadzu Corporation).

Powder X-ray Diffraction

In the examples and comparative examples, the powder X-ray diffraction is performed by using an X-ray diffraction device, SmartLab® (manufactured by Rigaku Corporation).

In the powder X-ray diffraction, a CuKα laser is used as a ray source.

By interpreting the X-ray diffraction spectrum obtained from the powder X-ray diffraction, the inorganic compound formed in the specimen undergoes a qualitative analysis and a quantitative analysis.

Table 1 shows the process conditions for the precursor preparation process and the firing process of the following examples and comparative examples. In addition, Table 2 shows the characteristics of the obtained precursors and fired articles.

TABLE 1

| | | Precursor Preparation Process | | | | | Firing Process | | |
|---|---|---|---|---|---|---|---|---|---|
| | | $Si_3N_4$ | | | | | Atmosphere | | |
| | Objective Composition | D50V (nm) | mass % | $Sr(NO_3)_2$ mass % | $Ca(NO_3)_2 \cdot 4H_2O$ mass % | $Eu(NO_3)_3 \cdot 6H_2O$ mass % | Components | Ratio (volume) | Temperature ° C. |
| Ex. 1 | $Eu_{0.1}Sr_{0.9}Si_2O_2N_2$ | 50 | 28.461 | 57.964 | — | 13.575 | $H_2/N_2$ | 4%/96% | 1450 |
| Ex. 2 | $Eu_{0.1}Sr_{0.45}Ca_{0.45}Si_2O_2N_2$ | 50 | 27.537 | 28.040 | 31.289 | 13.134 | $H_2/N_2$ | 4%/96% | 1450 |
| Ex. 3 | $Eu_{0.1}Sr_{0.9}Si_2O_2N_2$ | 50 | 28.461 | 57.964 | — | 13.575 | $NH_3/N_2$ | 4%/96% | 1450 |
| Ex. 4 | $Eu_{0.1}Sr_{0.9}Si_2O_2N_2$ | 50 | 28.461 | 57.964 | — | 13.575 | $H_2/N_2$ | 4%/96% | 1250 |
| Ex. 5 | $Eu_{0.1}Sr_{0.9}Si_2O_2N_2$ | 50 | 28.461 | 57.964 | — | 13.575 | $H_2/N_2$ | 4%/96% | 1550 |
| Ex. 6 | $Eu_{0.1}Sr_{0.7}Ca_{0.2}Si_2O_2N_2$ | 50 | 28.043 | 44.420 | 14.162 | 13.575 | $H_2/N_2$ | 4%/96% | 1450 |

TABLE 1-continued

| | | Precursor Preparation Process | | | | | Firing Process | | |
|---|---|---|---|---|---|---|---|---|---|
| | | $Si_3N_4$ | | | | | Atmosphere | | |
| | Objective Composition | D50V (nm) | mass % | $Sr(NO_3)_2$ mass % | $Ca(NO_3)_2 \cdot 4H_2O$ mass % | $Eu(NO_3)_3 \cdot 6H_2O$ mass % | Components | Ratio (volume) | Temperature °C. |
| Ex. 7 | $Eu_{0.1}Sr_{0.2}Ca_{0.7}Si_2O_2N_2$ | 50 | 27.048 | 12.241 | 47.809 | 12.901 | $H_2/N_2$ | 4%/96% | 1450 |
| Ex. 8 | $Eu_{0.15}Sr_{0.85}Si_{0.2}O_2N_2$ | 50 | 27.481 | 52.858 | — | 19.661 | $H_2/N_2$ | 4%/96% | 1450 |
| Ex. 9 | $Eu_{0.05}Sr_{0.95}Si_2O_2N_2$ | 50 | 29.514 | 63.447 | — | 7.039 | $H_2/N_2$ | 4%/96% | 1450 |
| Ex. 10 | $Eu_{0.1}Sr_{0.9}Si_2O_2N_2$ | 110 | 28.461 | 57.964 | — | 13.575 | $H_2/N_2$ | 4%/96% | 1450 |
| Ex. 11 | $Eu_{0.1}Sr_{0.9}Si_2O_2N_2$ | 25 | 28.461 | 57.964 | — | 13.575 | $H_2/N_2$ | 4%/96% | 1450 |
| Comp. Ex. 1 | $Eu_{0.1}Sr_{0.9}Si_2O_2N_2$ | 195 | 28.461 | 57.964 | — | 13.575 | $H_2/N_2$ | 4%/96% | 1450 |
| Comp. Ex. 2 | $Eu_{0.1}Sr_{0.9}Si_2O_2N_2$ | 50 | 28.461 | 57.964 | — | 13.575 | $N_2$ | 100% | 1450 |
| Comp. Ex. 3 | $Eu_{0.1}Sr_{0.9}Si_2O_2N_2$ | 50 | 28.461 | 57.964 | — | 13.575 | $H_2/N_2$ | 4%/96% | 1100 |
| Comp. Ex. 4 | $Eu_{0.1}Sr_{0.9}Si_2O_2N_2$ | 50 | 28.461 | 57.964 | — | 13.575 | $H_2/N_2$ | 4%/96% | 1700 |
| Comp. Ex. 5 | $Eu_{0.1}Sr_{0.457}Ca_{0.45}Si_2O_2N_2$ | 50 | 27.537 | 28.040 | 31.289 | 13.134 | $H_2/N_2$ | 4%/96% | 1700 |
| Comp. Ex. 6 | $Eu_{0.1}Sr_{0.1}Ca_{0.8}Si_2O_2N_2$ | 50 | 26.858 | 6.078 | 54.254 | 12.810 | $H_2/N_2$ | 4%/96% | 1450 |
| Comp. Ex. 7 | $Eu_{0.005}Sr_{0.995}Si_2O_2N_2$ | 50 | 30.530 | 68.741 | — | 0.728 | $H_2/N_2$ | 4%/96% | 1450 |
| Comp. Ex. 8 | $Eu_{0.25}Sr_{0.75}Si_2O_2N_2$ | 50 | 25.710 | 43.634 | — | 30.657 | $H_2/N_2$ | 4%/96% | 1450 |
| Comp. Ex. 9 | Commercially available $MSi_2O_2N_2$-based phosphor | | | | | | | | |
| Comp. Ex. 10 | Commercially available $MSi_2O_2N_2$-based phosphor pulverized by bead mill | | | | | | | | |

TABLE 2

| | Precursor | Phosphor | | | | | | |
|---|---|---|---|---|---|---|---|---|
| | | Powder X-ray Diffraction | | Particle properties | | Luminescence Characteristics | | Inner Quantum |
| | D50V (nm) | Si-comprising compound | Content (mass %) | D50V (nm) | PSDV | Excitation light (nm) | Luminescence Peak (nm) | Efficiency % |
| Ex. 1 | 127 | $SiO_2$ | 15 | 165 | 1.26 | 200~500 | 550 | 73 |
| Ex. 2 | 112 | $SiO_2$ | 11 | 142 | 1.24 | 200~500 | 543 | 81 |
| Ex. 3 | 127 | $SiO_2$ | 8 | 153 | 1.27 | 200~500 | 550 | 83 |
| Ex. 4 | 127 | $SiO_2$ | 18 | 148 | 1.25 | 200~500 | 550 | 72 |
| Ex. 5 | 127 | $SiO_2$ | 12 | 173 | 1.24 | 200~500 | 552 | 80 |
| Ex. 6 | 121 | $SiO_2$ | 14 | 151 | 1.27 | 200~500 | 548 | 79 |
| Ex. 7 | 114 | $SiO_2$ | 12 | 146 | 1.23 | 200~500 | 541 | 77 |
| Ex. 8 | 131 | $SiO_2$ | 16 | 168 | 1.31 | 200~500 | 551 | 75 |
| Ex. 9 | 133 | $SiO_2$ | 15 | 157 | 1.29 | 200~500 | 550 | 74 |
| Ex. 10 | 208 | $SiO_2$ | 13 | 329 | 1.22 | 200~500 | 549 | 79 |
| Ex. 11 | 53 | $SiO_2$ | 16 | 113 | 1.30 | 200~500 | 550 | 73 |
| Com. Ex. 1 | 286 | $SiO_2$ | 15 | 438 | 1.41 | 200~500 | 550 | 76 |
| Com. Ex. 2 | 127 | $Sr_2SiO_4$ | 95 | 184 | 1.33 | 200~500 | 557 | 50 |
| Com. Ex. 3 | 127 | Fail to obtain phosphor (firing is insufficient) | | | | | | |
| Com. Ex. 4 | 127 | $SiO_2$ | 7 | 960 | 1.45 | 200~500 | 551 | 81 |
| Com. Ex. 5 | 112 | Fail to obtain phosphor (the precursor is fused as the high Ca content lowers the fusing temperature) | | | | | | |
| Com. Ex. 6 | 118 | Fail to obtain phosphor (the precursor is fused as the high Ca content lowers the fusing temperature) | | | | | | |
| Com. Ex. 7 | 123 | $SiO_2$ | 17 | 186 | 1.32 | 200~500 | 548 | 52 |
| Com. Ex. 8 | 132 | $SiO_2$ | 16 | 172 | 1.31 | 200~500 | 545 | 48 |
| Com. Ex. 9 | — | — | 0 | 15 400 | 2.22 | 200~500 | 550 | 77 |
| Com. Ex. 10 | — | — | 0 | 364 | 1.33 | 200~500 | 562 | 36 |

Example 1

Preparation of Precursor (Suspension Forming Process)

As a raw material, amorphous silicon nitride particles (manufactured by Sigma Aldrich) having a volume average particle diameter D50V of 50 nm and strontium nitrate (Kishida Chemical Co., Ltd.) and europium nitrate 6 hydrate (Kishida Chemical Co., Ltd.) are used.

In order to obtain oxynitride represented by a formula of $Eu_{0.1}Sr_{0.9}Si_2O_2N_2$, the silicon nitride particle, the strontium nitrate, and the europium nitrate 6 hydrate are weighted at 28.461 mass %, 57.964 mass %, and 13.575 mass %, respectively. By the weighting, the mole ratio of the total amount of Sr and Eu and silicon is about 1:2 in the suspension and the phosphor precursor particles, and 90 mol % of Sr and 10 mol % of Eu, based on the total amount of Sr and Eu, are included therein. The weighted raw materials are added into a mixed solvent including 100 g of water and 50 g of ethylene glycol, and agitated to provide a suspension.

(Precursor Forming Process)

Ammonium hydrogen carbonate (KISHIDA CHEMICAL Co., Ltd.) is dissolved in water to provide 216 ml of a co-precipitation agent of an ammonium hydrogen carbonate aqueous solution in a concentration of 0.158 mol/L.

Then, the co-precipitation agent is dripped therein for 1 hour while the obtained suspension is agitated and mixed. After dripping the co-precipitation agent therein, the agitating and mixing are continued for 2 hours. Thereby, strontium ions and europium ions are precipitated as a carbonate and a hydroxide, respectively, to provide phosphor precursor particles in which the carbonate of strontium and the hydroxide of europium are uniformly mixed with each other and deposited on the surface of silicon nitride particles.

Then the suspension including the phosphor precursor particles is centrifuged to perform solvent substitution from a mixed solvent of water and ethylene glycol to water. After the solvent substitution, the suspension is introduced into a dryer set at 100° C., and water is evaporated to recover phosphor precursor particles.

Firing Process

The obtained phosphor precursor particles are fired as follows.

First, the obtained phosphor precursor particles are charged into a crucible made of boron nitride. Then the crucible charged with the phosphor precursor particles is introduced into a vacuum furnace (manufactured by NEMS), which is a metal furnace. After introducing the crucible into the furnace, the furnace is evacuated by a diffusion pump. Then the inside temperature of the furnace is increased from room temperature to 1100° C. at a rate of 300° C. per hour. Then while maintaining the inside temperature of furnace at 1100° C., a mixed gas of 4 volume % of hydrogen and 96 volume % of nitrogen is injected into the furnace, and the inside pressure of the furnace is returned to atmospheric pressure. Then the inside temperature of the furnace is increased to 1450° C. at a rate of 300° C. per hour, and the phosphor precursor particles are fired while maintaining the inside temperature at 1450° C. for 3 hours to provide a fired article.

Characteristics of Phosphor Precursor Particle

The obtained phosphor precursor particles are observed using a scanning electron microscope.

FIG. 1 is an image obtained by observing the phosphor precursor particles by a scanning electron microscope (SEM). In FIG. 1, many particles having a particle diameter of about 100 nm are found. Thereby, it is confirmed that the carbonate of strontium and the hydroxide of europium are deposited on the surface of silicon nitride particles.

In addition, the obtained phosphor precursor particles are measured for a particle-size distribution.

The results of measuring a particle-size distribution show that the phosphor precursor particles have a volume average particle diameter D50V of about 127 nm.

Characteristics of Phosphor

The obtained fired article is measured for an excitation luminescence spectrum.

Figure 2:
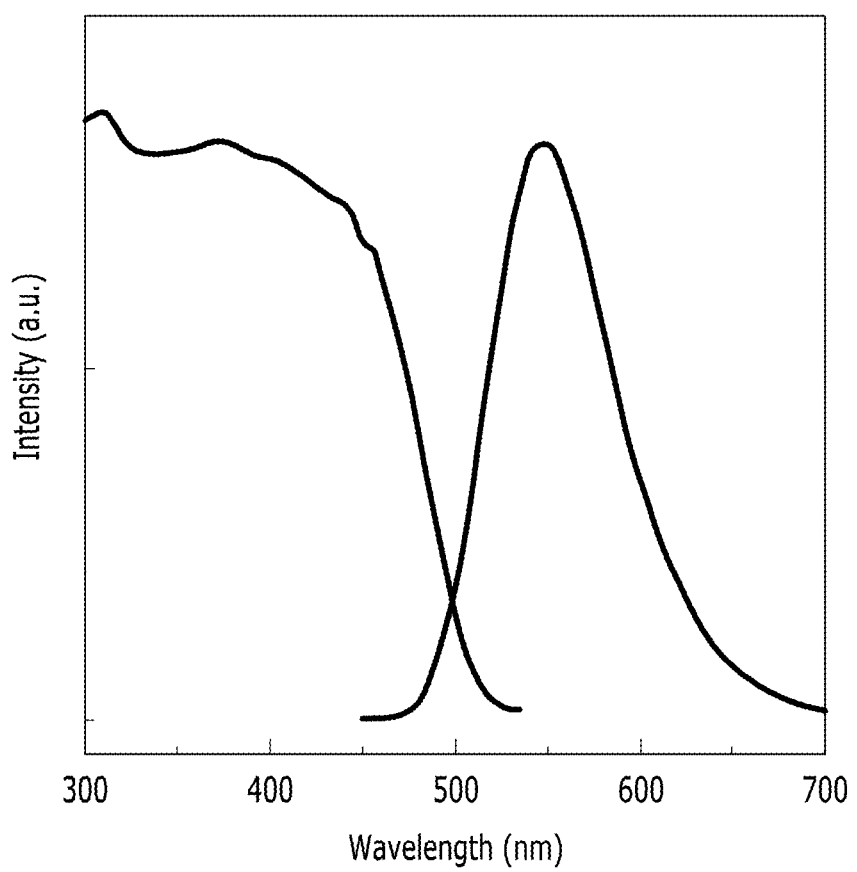
FIG. 2 shows an excitation luminescence spectrum of a phosphor according to Example 1. Intensity in this and other Figures intensity is in arbitrary units ("a.u.").

FIG. 2 shows an excitation luminescence spectrum of a fired article according to Example 1.

In FIG. 2, a horizontal axis represents a wavelength, and a vertical axis represents intensity.

From the excitation luminescence spectrum results, it is understood that the fired article is excited by light having a wide wavelength range from ultraviolet rays of greater than or equal to about 200 nm to visible light of less than or equal to about 500 nm, so it is understood that the luminescence peak wavelength belongs to yellow-green light of 550 nm. Thereby, it is confirmed that the obtained fired article is a phosphor excited by visible light.

In addition, the obtained fired article undergoes powder X-ray diffraction.

Figure 3:
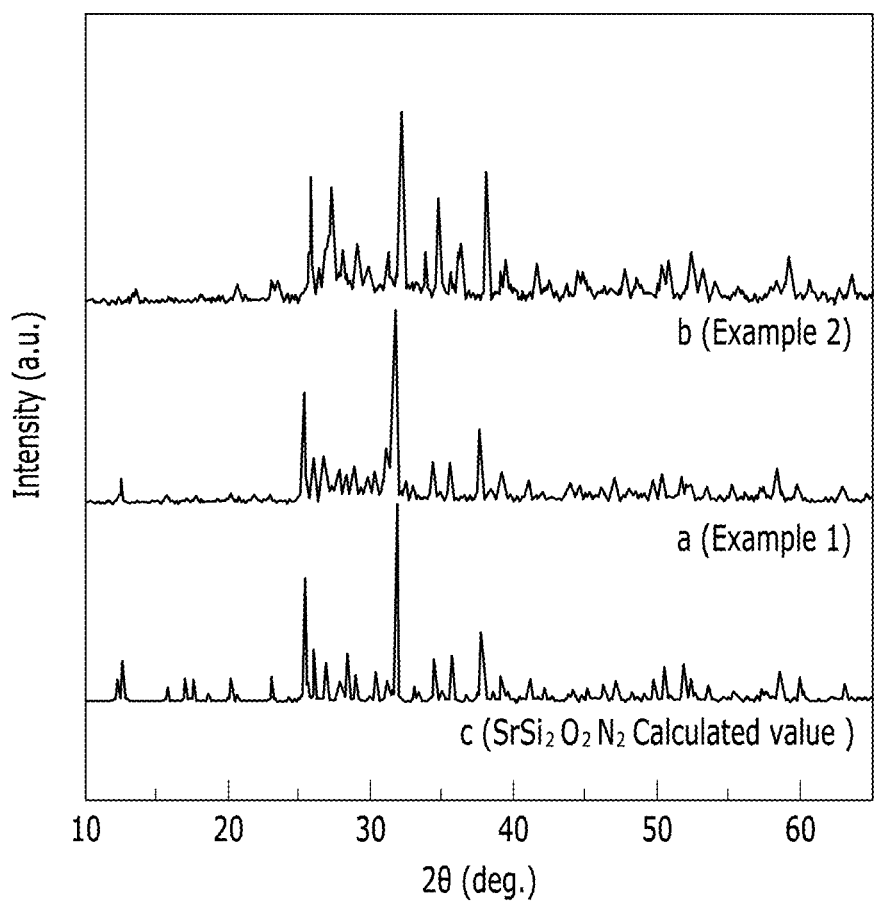
FIG. 3 shows an X-ray diffraction spectrum of phosphors according to Example 1 and Example 2.

In FIG. 3 "a" indicates an X-ray diffraction spectrum of the fired article according to Example 1.

In FIG. 3, the horizontal axis represents an angle between the direction of incident X-rays and the direction of diffraction X-rays, and the vertical axis represents intensity.

According to interpreting the X-ray diffraction spectrum by the Rietveld method, it is understood that oxynitride having a crystal structure such as $SrSi_2O_2N_2$ and a silicon-containing compound having a crystal structure such as $SiO_2$ are generated in the obtained fired article.

In addition, it is understood that oxynitride is generated at 85 mass %, and the silicon-containing compound is generated at 15 mass %, based on the total amount of oxynitride and the silicon-containing compound.

On the other hand, c in FIG. 3 indicates an X-ray diffraction spectrum of $SrSi_2O_2N_2$ crystal obtained from the calculation.

In addition, the obtained fired article is analyzed for metal elements.

From the results of analyzing for metal elements, it is understood that the obtained fired article includes Sr and Eu at a mole ratio of Sr:Eu=0.9:0.1.

In addition, the obtained fired article is measured for a particle-size distribution.

As shown in the results of measuring for a particle-size distribution, the obtained fired article has a volume average particle diameter D50V of 165 nm and a volume average particle-size distribution index PSDV of 1.26.

In addition, the obtained fired article is measured for inner quantum efficiency at an excitation wavelength of 450 nm.

As shown in the measured results, the fired article has inner quantum efficiency of 73% at an excitation wavelength of 450 nm.

As shown above, the phosphor obtained from Example 1 includes an oxynitride containing Sr, Eu, and Si. The phosphor is represented by a formula of $Eu_{0.1}Sr_{0.9}Si_2O_2N_2$. As in shown in the formula, the phosphor includes 90 mol % of Sr and 10 mol % of Eu based on the total amount of Sr and Eu. The oxynitride has a crystal structure such as $SrSi_2O_2N_2$.

The phosphor has a volume average particle diameter D50V of 165 nm and a volume average particle-size distribution index PSDV of 1.26.

The phosphor has inner quantum efficiency of 73% at an excitation wavelength of 450 nm.

The phosphor includes oxynitride at 85 mass % based on the total amount of oxynitride and the silicon-containing compound.

Example 2

As a raw material, amorphous silicon nitride particles (manufactured by Sigma-Aldrich Co., LLC.) having a volume average particle diameter D50V of 50 nm and strontium nitrate (Kishida Chemical Co., Ltd.), calcium nitrate 4 hydrate (Kishida Chemical Co., Ltd.), and europium nitrate 6 hydrate (Kishida Chemical Co., Ltd.) are used.

In order to obtain oxynitride represented by a formula of $Eu_{0.1}Sr_{0.45}Ca_{0.45}Si_2O_2N_2$, silicon nitride particles, strontium nitrate, calcium nitrate 4 hydrate, and europium nitrate 6 hydrate are weighted at 27.537 mass %, 28.040 mass %, 31.289 mass %, and 13.134 mass %, respectively.

By weighting thus, a mole ratio of the total amount of Sr, Ca, and Eu, and the silicon, is 1:2 in the suspension, and the phosphor precursor particles, and Sr and Eu, are included at 45 mol % and 10 mol %, respectively, based on the total amount of Sr, Ca, and Eu.

Except for this, the phosphor precursor particles and a fired article are obtained in accordance with the same procedure as in Example 1.

When measuring the particle-size distribution of the obtained phosphor precursor particles, the phosphor precursor particles have a volume average particle diameter D50V of 112 nm.

In addition, by measuring the obtained fired article for a luminescence spectrum, it is understood that it is excited by light having a wavelength range of greater than or equal to 200 nm and less than or equal to 500 nm, and has a luminescence peak wavelength of 543 nm. Thereby, it is confirmed that the obtained fired article is phosphor excited by visible light.

Figure 4:
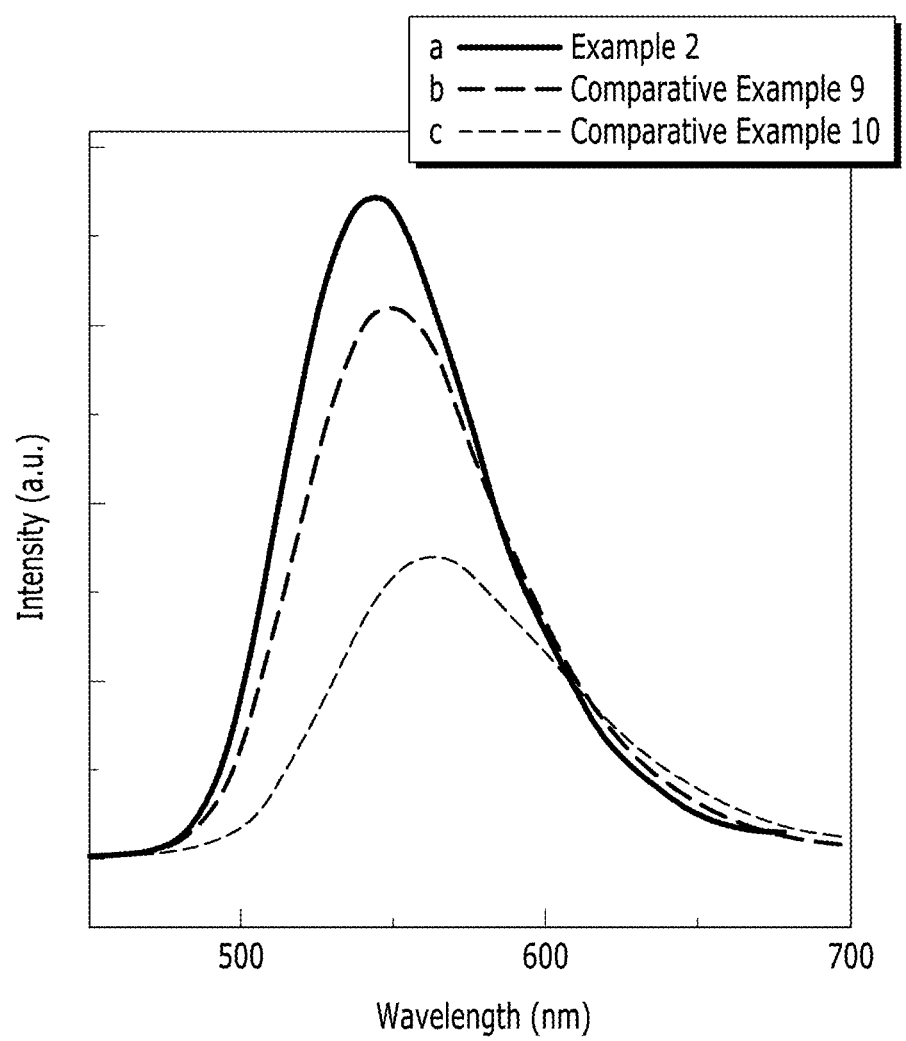
FIG. 4 shows a luminescence spectrum of phosphors according to Example 2, Comparative Example 9, and Comparative Example 10.

In FIG. 4 "a" indicates a luminescence spectrum of a fired article according to Example 2.

The horizontal axis of FIG. 4 represents a wavelength, and the vertical axis represents intensity.

In addition, by performing powder X-ray diffraction on the obtained fired article, it is understood that the oxynitride including a crystal structure such as Sr $Si_2O_2N_2$ and the silicon-containing compound including a crystal structure such as $SiO_2$ are generated in the obtained fired article.

In addition, based on the total amount of the oxynitride and the silicon-containing compound, oxynitride is generated at 89 mass %, and the silicon-containing compound is generated at 11 mass %.

b in FIG. 3 indicates an X-ray diffraction spectrum of the fired article according to Example 2.

By performing an atomic analysis of the obtained fired article, it is found that Sr, Ca, and Eu are included at a mole ratio of Sr:Ca:Eu=0.45:0.45:0.1.

Further, by measuring a particle-size distribution of the obtained fired article, it is found that the fired article has a volume average particle diameter D50V of 142 nm and a volume average particle-size distribution index PSDV of 1.24.

When measuring the obtained fired article for the inner quantum efficiency at the excitation wavelength of 450 nm, it is found that the fired article has inner quantum efficiency of 81% at an excitation wavelength of 450 nm.

As shown above, the phosphor obtained from Example 2 includes the oxynitride containing Sr, Ca, Eu, and Si. In addition, the phosphor is represented by a formula of $Eu_{0.1}Sr_{0.45}Ca_{0.45}Si_2O_2N_2$. From the formula, it can be seen that the phosphor includes Sr at 45 mol % and Eu at 10 mol % based on the total amount of Sr, Ca, and Eu.

The oxynitride has a crystal structure such as $SrSi_2O_2N_2$.

The phosphor has a volume average particle diameter D50V of 142 nm and a volume average particle-size distribution index PSDV of 1.24.

The phosphor also has inner quantum efficiency of 81% at an excitation wavelength of 450 nm.

The phosphor includes the oxynitride at 89 mass % based on the total amount of oxynitride and the silicon-containing compound.

Example 3

Phosphor precursor particles are obtained in accordance with the same procedure as in Example 1.

In addition, it is fired in accordance with the same procedure as in Example 1 to provide a fired article, except that the phosphor precursor particles are fired under a mixed gas atmosphere of 4 volume % of ammonia and 96 volume % of nitrogen.

By performing the various measurements and analyses as in Example 1, it is understood that the obtained fired article is excited by light having a wavelength range from greater than or equal to 200 nm and less than or equal to 500 nm, and has a luminescence peak wavelength of 550 nm. Thereby, it is confirmed that the obtained fired article is phosphor excited by visible light.

In addition, it is understood that oxynitride including a crystal structure such as $SrSi_2O_2N_2$ and a silicon-containing compound including a crystal structure such as $SiO_2$ are generated in the obtained fired article.

It is further understood that the oxynitride is generated at 92 mass %, and the silicon-containing compound is generated at 8 mass % based on the total amount of oxynitride and the silicon-containing compound.

In addition, it is understood that the obtained fired article includes Sr and Eu at a mole ratio of Sr:Eu=0.9:0.1.

The obtained fired article has a volume average particle diameter D50V of 153 nm and a volume average particle-size distribution index PSDV of 1.27.

The obtained fired article has inner quantum efficiency of 83% at an excitation wavelength of 450 nm.

As shown above, the phosphor obtained from Example 3 includes oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 153 nm and a volume average particle-size distribution index PSDV of 1.27.

The phosphor has inner quantum efficiency of 83% at an excitation wavelength of 450 nm.

The phosphor includes the oxynitride at 92 mass % based on the total amount of oxynitride and the silicon-containing compound.

Example 4

Phosphor precursor particles are obtained in accordance with the same procedure as in Example 1.

In addition, it is fired in accordance with the same procedure as in Example 1 to provide a fired article, except that the phosphor precursor particles are fired at 1250° C.

By performing the various measurements and analyses as in Example 1, it is understood that the obtained fired article is excited by light having a wavelength range from greater than or equal to 200 nm and less than or equal to 500 nm, and has a luminescence peak wavelength of 550 nm. Thereby, it is confirmed that the obtained fired article is a phosphor excited by visible light. It is also understood that oxynitride having a crystal structure such as $SrSi_2O_2N_2$ and a silicon-containing compound having a crystal structure such as $SiO_2$ are generated in the obtained fired article.

It is further understood that the oxynitride is generated at 82 mass %, and the silicon-containing compound is generated at 18 mass % based on the total amount of oxynitride and the silicon-containing compound.

It is further understood that the obtained fired article includes Sr and Eu at a mole ratio of Sr:Eu=0.9:0.1

The obtained fired article has a volume average particle diameter D50V of 148 nm and a volume average particle-size distribution index PSDV of 1.25.

The obtained fired article has inner quantum efficiency of 72% at an excitation wavelength of 450 nm.

As shown above, the phosphor obtained from Example 4 includes the oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 148 nm and a volume average particle-size distribution index PSDV of 1.25.

The phosphor has inner quantum efficiency of 72% at an excitation wavelength of 450 nm.

The phosphor includes the oxynitride at 82 mass % based on the total amount of oxynitride and the silicon-containing compound.

Example 5

Phosphor precursor particles are obtained in accordance with the same procedure as in Example 1.

It is fired in accordance with the same procedure as in Example 1 to provide a fired article, except that the phosphor precursor particles are fired at 1550° C.

By performing the various measurements and analyses as in Example 1, it is understood that the obtained fired article is excited by light having a wavelength range from greater than or equal to 200 nm and less than or equal to 500 nm, and has a luminescence peak wavelength of 552 nm. Thereby, it is confirmed that the obtained fired article is a phosphor excited by visible light.

It is further understood that an oxynitride having a crystal structure such as $SrSi_2O_2N_2$ and a silicon-containing compound having a crystal structure such as $SiO_2$ are generated in the obtained fired article.

It is also understood that the oxynitride is generated at 88 mass %, and the silicon-containing compound is generated at 12 mass % based on the total amount of oxynitride and the silicon-containing compound.

In addition, it is understood that the obtained fired article includes Sr and Eu at a mole ratio of Sr:Eu=0.9:0.1.

The obtained fired article has a volume average particle diameter D50V of 173 nm and a volume average particle-size distribution index PSDV of 1.24.

The obtained fired article has inner quantum efficiency of 80% at an excitation wavelength of 450 nm.

As shown above, the phosphor obtained from Example 5 includes the oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 173 nm and a volume average particle-size distribution index PSDV of 1.24.

The phosphor has inner quantum efficiency of 80% at an excitation wavelength of 450 nm.

The phosphor includes the oxynitride at 88 mass % based on the total amount of oxynitride and the silicon-containing compound.

Example 6

Phosphor precursor particles and a fired article are obtained in accordance with the same procedure as in Example 2, except that silicon nitride particles, strontium nitrate, calcium nitrate 4 hydrate, and europium nitrate 6 hydrate are weighted at 28.043 mass %, 44.420 mass %, 14.162 mass %, and 13.375 mass %, respectively, to provide an oxynitride represented by a formula $Eu_{0.1}Sr_{0.7}Ca_{0.2}Si_2O_2N_2$.

When carrying out various measurements and analyses as in Example 1, it is found that the obtained phosphor precursor particles have a volume average particle diameter D50V of 121 nm.

It is understood that the obtained fired article is excited by light having a wavelength range from greater than or equal to 200 nm and less than or equal to 500 nm, and has a luminescence peak wavelength of 548 nm. Thereby, it is confirmed that the obtained fired article is phosphor excited by visible light.

In addition, it is understood that the oxynitride having a crystal structure such as $SrSi_2O_2N_2$ and a silicon-containing compound having a crystal structure such as $SiO_2$ are generated in the obtained fired article.

In addition, the oxynitride is generated at 86 mass %, and the silicon-containing compound is generated at 14 mass % based on the total amount of oxynitride and the silicon-containing compound.

In addition, it is understood that the obtained fired article includes Sr, Ca, and Eu at a mole ratio of Sr:Ca:Eu=0.7:0.2:0.1.

In addition, the obtained fired article has a volume average particle diameter D50V of 151 nm and a volume average particle-size distribution index PSDV of 1.27.

In addition the obtained fired article has inner quantum efficiency of 79% at an excitation wavelength of 450 nm.

From the results, the phosphor obtained from Example 6 includes the oxynitride containing Sr, Ca, Eu, and Si.

The phosphor is represented by a formula of $Eu_{0.1}Sr_{0.7}Ca_{0.2}Si_2O_2N_2$. From the formula, it is understood that the phosphor includes Sr at 70 mol % and Eu at 10 mol % based on the total amount of Sr, Ca, and Eu.

In addition, the oxynitride has a crystal structure such as $SrSi_2O_2N_2$.

The phosphor has a volume average particle diameter D50V of 151 nm and a volume average particle-size distribution index PSDV of 1.27.

The phosphor has inner quantum efficiency of 79% at an excitation wavelength of 450 nm.

The phosphor includes the oxynitride at 86 mass % based on the total amount of the oxynitride and the silicon-containing compound.

Example 7

Phosphor precursor particles and a fired article are obtained in accordance with the same procedure as in Example 2, except that silicon nitride particles, strontium nitrate, calcium nitrate 4 hydrate, and europium nitrate 6 hydrate are weighted at 27.048 mass %, 12.241 mass %, 47.809 mass %, and 12.901 mass %, respectively, to provide oxynitride represented by a formula $Eu_{0.1}Sr_{0.2}Ca_{0.7}Si_2O_2N_2$.

When performing the various measurements and analyses as in Example 1, the obtained phosphor precursor particles are found to have a volume average particle diameter D50V of 114 nm.

It is understood that the obtained fired article is excited by light having a wavelength range from greater than or equal to 200 nm and less than or equal to 500 nm, and has a luminescence peak wavelength of 541 nm. Thereby, it is confirmed that the obtained fired article is phosphor excited by visible light.

It is also understood that the oxynitride having a crystal structure such as $SrSi_2O_2N_2$ and a silicon-containing compound having a crystal structure such as $SiO_2$ are generated in the obtained fired article.

In addition, it is understood that the oxynitride is generated at 88 mass %, and the silicon-containing compound is generated at 12 mass % based on the total amount of the oxynitride and the silicon-containing compound.

The obtained fired article includes Sr, Ca, and Eu at a mole ratio of Sr:Ca:Eu=0.2:0.7:0.1.

In addition, the obtained fired article has a volume average particle diameter D50V of 146 nm and a volume average particle-size distribution index PSDV of 1.23.

The obtained fired article has inner quantum efficiency of 77% at an excitation wavelength of 450 nm.

As shown above, the phosphor obtained from Example 7 includes the oxynitride containing Sr, Ca, Eu, and Si.

The phosphor is represented by a formula of $Eu_{0.1}Sr_{0.2}Ca_{0.7}Si_2O_2N$ 2. From the formula, it is understood that the phosphor includes Sr at 20 mol % and Eu at 10 mol % based on the total amount of Sr, Ca, and Eu.

In addition, the oxynitride has a crystal structure such as $SrSi_2O_2N_2$.

The phosphor has a volume average particle diameter D50V of 146 nm and a volume average particle-size distribution index PSDV of 1.23.

The phosphor has inner quantum efficiency of 77% at an excitation wavelength of 450 nm.

The phosphor includes the oxynitride at 88 mass % based on the total amount of the oxynitride and the silicon-containing compound.

Example 8

Phosphor precursor particles and a fired article are obtained in accordance with the same procedure as in Example 1, except that silicon nitride particles, strontium nitrate, and europium nitrate 6 hydrate are weighted at 27.481 mass %, 52.858 mass %, and 19.661 mass %, respectively, to provide an oxynitride represented by a formula $Eu_{0.15}Sr_{0.85}Si_2O_2N_2$.

When performing the various measurements and analyses as in Example 1, the obtained phosphor precursor particles are found to have a volume average particle diameter D50V of 131 nm.

In addition, it is understood that the obtained fired article is excited by light having a wavelength range from greater than or equal to 200 nm and less than or equal to 500 nm, and has a luminescence peak wavelength of 551 nm. Thereby, it is confirmed that the obtained fired article is phosphor excited by visible light.

It is also understood that an oxynitride having a crystal structure such as $SrSi_2O_2N_2$ and a silicon-containing compound having a crystal structure such as $SiO_2$ are generated in the obtained fired article.

In addition, it is further understood that the oxynitride is generated at 84 mass %, and the silicon-containing compound is generated at 16 mass % based on the total amount of oxynitride and the silicon-containing compound.

In addition, it is understood that the obtained fired article includes Sr and Eu at a mole ratio of Sr:Eu=0.85:0.15.

The obtained fired article has a volume average particle diameter D50V of 168 nm and a volume average particle-size distribution index PSDV of 1.31.

In addition, the obtained fired article has inner quantum efficiency of 75% at an excitation wavelength of 450 nm.

As shown above, the phosphor obtained from Example 8 includes the oxynitride containing Sr, Eu, and Si.

The phosphor is represented by a formula of $Eu_{0.15}Sr_{0.85}Si_2O_2N_2$.

From the formula, it is understood that the phosphor includes Sr at 85 mol % and Eu at 15 mol % based on the total amount of Sr and Eu.

The oxynitride has a crystal structure such as $SrSi_2O_2N_2$.

The phosphor has a volume average particle diameter D50V of 168 nm and a volume average particle-size distribution index PSDV of 1.31.

In addition, the phosphor has an inner quantum efficiency of 75% at an excitation wavelength of 450 nm.

The phosphor includes the oxynitride at 84 mass % based on the total amount of the oxynitride and the silicon-containing compound.

Example 9

Phosphor precursor particles and a fired article are obtained in accordance with the same procedure as in Example 1, except that silicon nitride particles, strontium nitrate, and europium nitrate 6 hydrate are weighted at 29.514 mass %, 63.447 mass %, and 7.039 mass %, respectively, to provide an oxynitride represented by a formula of $Eu_{0.05}Sr_{0.95}Si_2O_2N_2$.

When performing the various measurements and analyses as in Example 1, the obtained phosphor precursor particles are found to have a volume average particle diameter D50V of 133 nm.

In addition, it is understood that the obtained fired article is excited by light having a wavelength range from greater than or equal to 200 nm and less than or equal to 500 nm, and has a luminescence peak wavelength of 550 nm. Thereby, it is confirmed that the obtained fired article is phosphor excited by visible light.

It is also understood that the oxynitride having a crystal structure such as $SrSi_2O_2N_2$ and a silicon-containing compound having a crystal structure such as $SiO_2$ are generated in the obtained fired article.

It is further understood that the oxynitride is generated at 85 mass %, and the silicon-containing compound is generated at 15 mass % based on the total amount of the oxynitride and the silicon-containing compound.

It is understood that the obtained fired article includes Sr and Eu at a mole ratio of Sr:Eu=0.95:0.05.

The obtained fired article has a volume average particle diameter D50V of 157 nm and a volume average particle-size distribution index PSDV of 1.29.

The obtained fired article has inner quantum efficiency of 74% at an excitation wavelength of 450 nm.

As shown above, the phosphor obtained from Example 9 includes the oxynitride containing Sr, Eu, and Si.

The phosphor is represented by a formula of $Eu_{0.05}Sr_{0.95}Si_2O_2N_2$.

From the formula, it is understood that the phosphor includes Sr at 95 mol % and Eu at 5 mol % based on the total amount of Sr and Eu.

The oxynitride has a crystal structure such as $SrSi_2O_2N_2$.

The phosphor has a volume average particle diameter D50V of 157 nm and a volume average particle-size distribution index PSDV of 1.29.

The phosphor has inner quantum efficiency of 74% at an excitation wavelength of 450 nm.

The phosphor includes the oxynitride at 85 mass % based on the total amount of the oxynitride and the silicon-containing compound.

Example 10

Phosphor precursor particles and a fired article are obtained in accordance with the same procedure as in Example 1, except that the raw material is silicon nitride particles having a volume average particle diameter D50V of 110 nm obtained by pulverizing the crystalline silicon nitride (manufactured by High Purity Chemicals) with a pulverizer (manufactured by Ashizawa Finetech Ltd., LMZ015).

When performing the various measurements and analyses as in Example 1, the obtained phosphor precursor particles are found to have a volume average particle diameter D50V of 208 nm.

In addition, it is understood that the obtained fired article is excited by light having a wavelength range from greater than or equal to 200 nm and less than or equal to 500 nm and has a luminescence peak wavelength of 549 nm. From the results, the obtained fired article is a phosphor excited by visible light.

In addition, it is understood that the oxynitride having a crystal structure such as $SrSi_2O_2N_2$ and a silicon-containing compound having a crystal structure such as $SiO_2$ are generated in the obtained fired article.

It is understood that the oxynitride is generated at 87 mass %, and the silicon-containing compound is generated at 13 mass % based on the total amount of the oxynitride and the silicon-containing compound.

It is also understood that the obtained fired article includes Sr and Eu at a mole ratio of Sr:Eu=0.9:0.1.

The obtained fired article has a volume average particle diameter D50V of 329 nm and a volume average particle-size distribution index PSDV of 1.22.

The obtained fired article has inner quantum efficiency of 79% at an excitation wavelength of 450 nm.

From the results, the phosphor obtained from Example 10 includes oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 329 nm and a volume average particle-size distribution index PSDV of 1.22.

The phosphor has inner quantum efficiency of 79% at an excitation wavelength of 450 nm.

The phosphor includes oxynitride at 87 mass % based on the total amount of the oxynitride and the silicon-containing compound.

Example 11

Phosphor precursor particles and a fired article are obtained in accordance with the same procedure as in Example 1, except that amorphous silicon nitride particles (manufactured by Hefei Kaier Nanometer Energy & Technology Co., Ltd.) having a volume average particle diameter D50V of 25 nm are used as a raw material.

When performing the various measurements and analyses as in Example 1, the obtained phosphor precursor particles are found to have a volume average particle diameter D50V of 53 nm.

In addition, it is understood that the obtained fired article is excited by light having a wavelength range from greater than or equal to 200 nm and less than or equal to 500 nm, and has a luminescence peak wavelength of 550 nm.

From the results, it is confirmed that the obtained fired article is phosphor excited by visible light.

In addition, it is understood that an oxynitride having a crystal structure such as $SrSi_2O_2N_2$ and a silicon-containing compound having a crystal structure such as $SiO_2$ are generated in the obtained fired article.

It is also understood that the oxynitride is generated at 84 mass %, and the silicon-containing compound is generated at 16 mass % based on the total amount of oxynitride and the silicon-containing compound.

It is further understood that the obtained fired article includes Sr and Eu at a mole ratio of Sr:Eu=0.9:0.1.

The obtained fired article has a volume average particle diameter D50V of 113 nm and a volume average particle-size distribution index PSDV of 1.30.

The obtained fired article has inner quantum efficiency of 73% at an excitation wavelength of 450 nm.

From the results, the phosphor obtained from Example 11 includes the oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 113 nm and a volume average particle-size distribution index PSDV of 1.30.

In addition, the phosphor has inner quantum efficiency of 73% at an excitation wavelength of 450 nm.

The phosphor includes the oxynitride at 84 mass % based on the total amount of the oxynitride and the silicon-containing compound.

Comparative Example 1

Phosphor precursor particles and a fired article are obtained in accordance with Example 1, except that crystalline silicon nitride particles (manufactured by Ube Industries, Ltd.) having a volume average particle diameter D50V of 195 nm is used as a raw material.

When performing the various measurements and analyses as in Example 1, the obtained phosphor precursor particles are found to have a volume average particle diameter D50V of 286 nm.

In addition, it is understood that the obtained fired article is excited by light having a wavelength range from greater than or equal to 200 nm and less than or equal to 500 nm, and has a luminescence peak wavelength of 550 nm. Thereby, it is confirmed that the obtained fired article is a phosphor excited by visible light.

It is also understood that an oxynitride having a crystal structure such as $SrSi_2O_2N_2$ and a silicon-containing compound having a crystal structure such as $SiO_2$ are generated in the obtained fired article.

It is further understood that the oxynitride is generated at 85 mass %, and the silicon-containing compound is generated at 15 mass % based on the total amount of the oxynitride and the silicon-containing compound.

In addition, it is understood that the obtained fired article includes Sr and Eu at a mole ratio of Sr:Eu=0.9:0.1.

The obtained fired article has a volume average particle diameter D50V of 438 nm and a volume average particle-size distribution index PSDV of 1.41.

The obtained fired article has inner quantum efficiency of 76% at an excitation wavelength of 450 nm.

As shown above, the phosphor obtained from Comparative Example 1 includes the oxynitride containing Sr, Eu, and Si. The phosphor is represented by a formula of $Eu_{0.1}Sr_{0.9}Si_2O_2N_2$.

From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 438 nm and a volume average particle-size distribution index PSDV of 1.41.

The phosphor has inner quantum efficiency of 76% at an excitation wavelength of 450 nm.

The phosphor includes the oxynitride at 85 mass % based on the total amount of the oxynitride and the silicon-containing compound.

Comparative Example 2

Phosphor precursor particles are obtained in accordance with the same procedure as in Example 1.

It is fired in accordance with the same procedure as in Example 1 to provide a fired article, except that the phosphor precursor particles are fired under a gas atmosphere of 100 volume % of nitrogen.

When performing the various measurements and analyses as in Example 1, it is understood that the obtained fired article is excited by light having a wavelength range from greater than or equal to 200 nm and less than or equal to 500 nm, and has a luminescence peak wavelength of 557 nm. From the results, it is confirmed that the obtained fired article is phosphor excited by visible light.

It is understood that an oxynitride having a crystal structure such as $SrSi_2O_2N_2$ and a silicon-containing compound having a crystal structure such as $Sr_2SiO_4$ are generated in the obtained fired article.

It is also understood that the oxynitride is generated at 5 mass %, and the silicon-containing compound is generated at 95 mass % based on the total amount of the oxynitride and the silicon-containing compound.

It is further understood that the obtained fired article includes Sr and Eu at a mole ratio of Sr:Eu=0.9:0.1.

The obtained fired article has a volume average particle diameter D50V of 18.4 nm and a volume average particle-size distribution index (PSDV) of 1.33.

The obtained fired article has inner quantum efficiency of 50% at an excitation wavelength of 450 nm.

From the results, the phosphor obtained from Comparative Example 2 includes the oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 184 nm and a volume average particle-size distribution index PSDV of 1.33.

The phosphor has inner quantum efficiency of 50% at an excitation wavelength of 450 nm.

The phosphor includes the oxynitride at 5 mass % based on the total amount of the oxynitride and the silicon-containing compound.

Comparative Example 3

Phosphor precursor particles are obtained in accordance with the same procedure as in Example 1.

In addition, it is fired in accordance with the same procedure as in Example 1 to provide a fired article, except that the phosphor precursor particles are fired at 1100° C.

By measuring an excitation luminescence spectrum of the obtained fired article, the fired article does not emit light. This is because of a lack of firing. Accordingly, phosphor is not obtained in Comparative Example 3.

Comparative Example 4

Phosphor precursor particles are obtained in accordance with the same procedure as in Example 1.

In addition, it is fired in accordance with the same procedure as in Example 1 to provide a fired article, except that the phosphor precursor particles are fired at 1700° C.

By performing the various measurements and analyses as in Example 1, it is understood that the obtained fired article is excited by light having a wavelength range from greater than or equal to 200 nm and less than or equal to 500 nm, and has a luminescence peak wavelength of 551 nm. Thereby, it is confirmed that the obtained fired article is a phosphor excited by visible light.

It is understood that an oxynitride including a crystal structure such as $SrSi_2O_2N_2$ and a silicon-containing compound including a crystal structure such as $SiO_2$ are generated in the obtained fired article.

It is also understood that the oxynitride is generated at 93 mass %, and the silicon-containing compound is generated at 7 mass % based on the total amount of the oxynitride and the silicon-containing compound.

It is further understood that the obtained fired article includes Sr and Eu at a mole ratio of Sr:Eu=0.9:0.1.

The obtained fired article has a volume average particle diameter D50V of 960 nm and a volume average particle-size distribution index PSDV of 1.45.

The obtained fired article has inner quantum efficiency of 81% at an excitation wavelength of 450 nm.

As shown above, the phosphor obtained from Comparative Example 4 includes the oxynitride containing Sr, Eu, and Si. The phosphor is represented by a formula of $Eu_{0.1}Sr_{0.9}Si_2O_2N_2$. From the formula, it is understood that the phosphor includes Sr at 90 mol % and Eu at 10 mol % based on the total amount of Sr and Eu.

The oxynitride has a crystal structure such as $SrSi_2O_2N_2$.

The phosphor has a volume average particle diameter D50V of 960 nm and a volume average particle-size distribution index PSDV of 1.45.

The phosphor has inner quantum efficiency of 81% at an excitation wavelength of 450 nm.

The phosphor includes the oxynitride at 93 mass % based on the total amount of the oxynitride and the silicon-containing compound.

Comparative Example 5

Phosphor precursor particles are obtained in accordance with the same procedure as in Example 2.

In addition, it is fired in accordance with the same procedure as in Example 1 to provide a fired article, except that the phosphor precursor particles are fired at 1700° C.

In Comparative Example 5, the phosphor precursor particles are fused during the firing, so that the phosphor is not obtained. This is because the fusing point of the oxynitride synthesized during the firing is decreased due to the excessive amount of calcium in the phosphor precursor particles.

Comparative Example 6

Phosphor precursor particles are obtained in accordance with the same procedure as in Example 2, except that silicon nitride particles, strontium nitrate, calcium nitrate 4 hydrate, and europium nitrate 6 hydrate are weighted at 26.858 mass %, 6.078 mass %, 54.254 mass %, and 12.810 mass %, respectively, to provide an oxynitride represented by a formula $Eu_{0.1}Sr_{0.1}Ca_{0.8}Si_2O_2N_2$. The phosphor precursor particles are fired in accordance with the same procedure as in Example 1.

In Comparative Example 6, the phosphor precursor particles are fused during the firing, so a phosphor is not obtained. This is because the fusing point of the oxynitride synthesized during the firing is decreased due to the excessive amount of calcium in the phosphor precursor particles.

Comparative Example 7

Phosphor precursor particles and a fired article are obtained in accordance with the same procedure as in Example 1, except that silicon nitride particles, strontium nitrate, and europium nitrate 6 hydrate are weighted at 30.530 mass %, 68.741 mass %, and 0.728 mass %, respectively, to provide an oxynitride represented by a formula $Eu_{0.005}Sr_{0.995}Si_2O_2N_2$.

When performing the various measurements and the analyses as in Example 1, the obtained phosphor precursor particles have a volume average particle diameter D50V of 123 nm.

In addition, it is understood that the obtained fired article is excited by light having a wavelength range of greater than or equal to 200 nm and less than or equal to 500 nm, and has a luminescence peak wavelength of 548 nm. Thereby, it is confirmed that the obtained fired article is a phosphor excited by visible light.

In addition, it is understood that an oxynitride having a crystal structure such as $Sr Si_2O_2N_2$ and a silicon-containing compound having a crystal structure such as $SiO_2$ are generated in the obtained fired article.

It is also understood that the oxynitride is generated at 83 mass %, and the silicon-containing compound is generated at 17 mass % based on the total amount of the oxynitride and the silicon-containing compound.

It is further understood that the obtained fired article includes Sr and Eu at a mole ratio of Sr:Eu=0.995:0.005.

The obtained fired article has a volume average particle diameter D50V of 186 nm and a volume average particle-size distribution index PSDV of 1.32.

The obtained fired article has inner quantum efficiency of 52% at an excitation wavelength of 450 nm.

From the results, the phosphor obtained from Comparative Example 7 includes oxynitride containing Sr, Eu, and Si. The phosphor is represented by a formula of $Eu_{0.005}Sr_{0.995}Si_2O_2N_2$.

From the formula, it is understood that the phosphor includes Sr at 99.5 mol % and Eu at 0.5 mol % based on the total amount of Sr and Eu.

The oxynitride has a crystal structure such as $SrSi_2O_2N_2$.

The phosphor has a volume average particle diameter D50V of 186 nm and a volume average particle-size distribution index PSDV of 1.32.

The phosphor has inner quantum efficiency of 52% at an excitation wavelength of 450 nm.

The phosphor includes the oxynitride at 83 mass % based on the total amount of the oxynitride and the silicon-containing compound.

Comparative Example 8

Phosphor precursor particles and a fired article are obtained in accordance with the same procedure as in Example 1, except that silicon nitride particles, strontium nitrate, and europium nitrate 6 hydrate are weighted at 25.710 mass %, 43.634 mass %, and 30.657 mass %, respectively, to provide an oxynitride represented by a formula $Eu_{0.25}Sr_{0.75}Si_2O_2N_2$.

When performing the various measurements and analyses as in Example 1, the obtained phosphor precursor particles have a volume average particle diameter D50V of 132 nm.

It is also understood that the obtained fired article is excited by light having a wavelength range from greater than or equal to 200 nm and less than or equal to 500 nm, and has a luminescence peak wavelength of 545 nm. Thereby, it is confirmed that the obtained fired article is a phosphor excited by visible light.

It is understood that an oxynitride having a crystal structure such as $SrSi_2O_2N_2$ and a silicon-containing compound having a crystal structure such as $SiO_2$ are generated in the obtained fired article.

It is also understood that the oxynitride is generated at 84 mass %, and the silicon-containing compound is generated at 16 mass % based on the total amount of the oxynitride and the silicon-containing compound.

The obtained fired article includes Sr and Eu at a mole ratio of Sr:Eu=0.75:0.25. The obtained fired article has a volume average particle diameter D50V of 172 nm and a volume average particle-size distribution index PSDV of 1.31.

The obtained fired article has inner quantum efficiency of 48% at an excitation wavelength of 450 nm.

As shown above, the phosphor obtained from Comparative Example 8 includes the oxynitride containing Sr, Eu, and Si. The phosphor is represented by a formula of $Eu_{0.25}Sr_{0.75}Si_2O_2N_2$. From the formula, it is understood that the phosphor includes Sr at 75 mol % and Eu at 25 mol % based on the total amount of Sr and Eu.

The oxynitride has a crystal structure such as $SrSi_2O_2N_2$.

The phosphor has a volume average particle diameter D50V of 172 nm and a volume average particle-size distribution index PSDV of 1.31.

The phosphor has inner quantum efficiency of 48% at an excitation wavelength of 450 nm.

The phosphor includes the oxynitride at 84 mass % based on the total amount of the oxynitride and the silicon-containing compound.

Comparative Example 9

A commercially available oxynitride phosphor (manufactured by Beijing Nakamura-Yufi Science and Technology Co., Ltd.) represented by a formula $Eu_{0.1}Sr_{0.45}Ba_{0.45}Si_2O_2N_2$ is used.

When performing the various measurements and analyses as in Example 1, it is understood that the obtained fired article is excited by light having a wavelength range from greater than or equal to 200 nm and less than or equal to 500 nm, and has a luminescence peak wavelength of 550 nm.

b of FIG. 4 indicates a luminescence spectrum of the commercially available oxynitride phosphor.

The commercially available oxynitride phosphor does not include other crystal components excepting the oxynitride having a crystal structure such as $SrSi_2O_2N_2$.

The commercially available oxynitride phosphor has a volume average particle diameter D50V of 15,400 nm and a volume average particle-size distribution index PSDV of 2.22.

The commercially available oxynitride phosphor has inner quantum efficiency of 77% at an excitation wavelength of 450 nm.

Comparative Example 10

The commercially available oxynitride phosphor used for Comparative Example 9 is pulverized by a bead mill and sorted to provide a sub-micron-sized oxynitride phosphor.

When performing the various measurements and analyses as in Example 1, it is found that the commercially available oxynitride phosphor is excited by light having a wavelength range of greater than or equal to about 200 nm and less than or equal to about 500 nm after the pulverizing, and has a luminescence peak wavelength of 562 nm.

c in FIG. 4 indicates a luminescence spectrum of the commercially available oxynitride phosphor after the pulverizing.

The commercially available oxynitride phosphor after the pulverization does not include other crystal components but includes the oxynitride including the crystal structure such as $SrSi_2O_2N_2$, but it is understood that a part of oxynitride crystal is amorphized by the pulverization.

In addition, the commercially available oxynitride phosphor after the pulverization has a volume average particle diameter D50V of 364 nm and a volume average particle-size distribution index PSDV of 1.33.

The commercially available oxynitride phosphor after the pulverization has inner quantum efficiency of 36% at an excitation wavelength of 450 nm.

Comparison and Review of Examples and Comparative Examples

Figure 5:
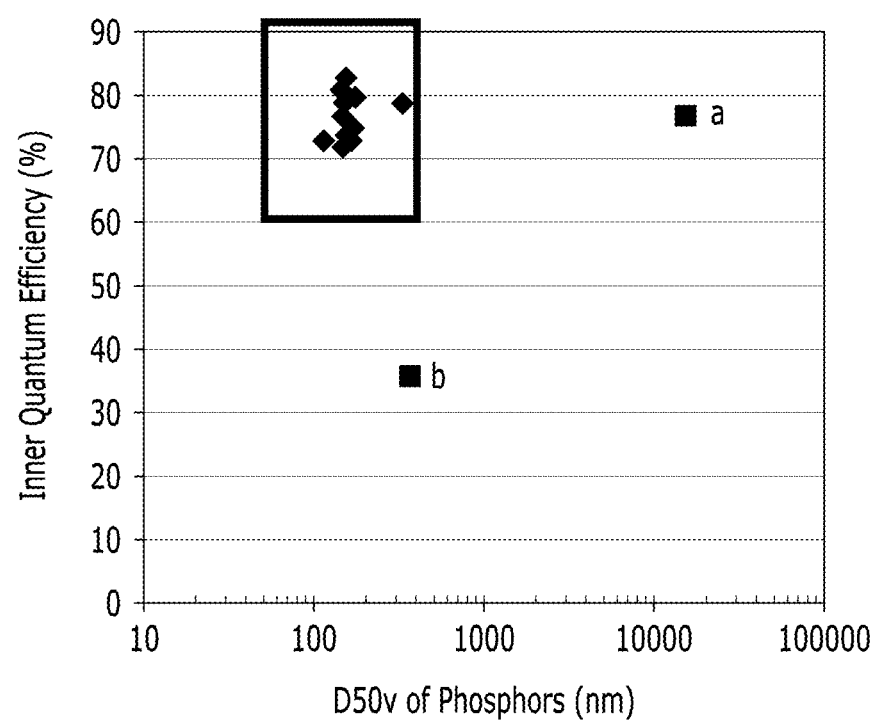
FIG. 5 is a graph showing a relationship between a volume average particle diameter of a phosphor and inner quantum efficiency at an excitation wavelength of 450 nm.

FIG. 5 is a graph showing a relationship of the volume average particle diameter D50V of a phosphor and inner quantum efficiency at an excitation wavelength of 450 nm.

In FIG. 5, the horizontal axis represents a volume average particle diameter D50V of phosphor, and the vertical axis represents inner quantum efficiency at an excitation wavelength of 450 nm.

In FIG. 5, the diamond-shaped points indicate Examples 1-11, and the square-shaped points a and b indicate Comparative Examples 9 and 10, respectively.

As shown in FIG. 5, the phosphors according to Examples 1-11 have a volume average particle diameter D50V of greater than or equal to about 50 nm and less than or equal to about 400 nm, and more specifically, greater than or equal to about 100 nm and less than or equal to about 350 nm, and inner quantum efficiency of greater than or equal to about 60%, and more specifically, greater than or equal to about 70% at an excitation wavelength of 450 nm. Thereby, the phosphors obtained from Examples 1-11 may have an excellent luminescence characteristic and a small particle diameter.

Particularly, Examples 2, 3, and 5 may provide phosphors having inner quantum efficiency of greater than or equal to about 80% at an excitation wavelength of 450 nm, with extremely good luminescence characteristics and a small particle diameter.

On the other hand, the phosphor obtained from Comparative Example 9 has high inner quantum efficiency of 77% at an excitation wavelength of 450 nm, but the volume average particle diameter D50V thereof is high at 15,400 nm.

For the phosphor of Comparative Example 10 obtained by pulverizing the phosphor according to Comparative Example 9, the volume average particle diameter D50V may be decreased to 364 nm, but the inner quantum efficiency at an excitation wavelength of 450 nm is deteriorated at 36%.

In addition, as shown in FIG. 4, the luminescence intensity at the luminescence peak wavelength of phosphors according to Comparative Examples 9 and 10 is lower than the luminescence intensity at the luminescence peak wavelength of the phosphor according to Example 2. Thereby, the commercially available phosphor (Comparative Examples 9 and 10) may not provide a phosphor having an excellent luminescence characteristic and a small particle diameter.

In addition, the phosphors according to Examples 1-11 have a volume average particle-size distribution index PSDV of greater than or equal to about 1.20 and less than or equal to about 1.35, and more specifically, greater than or equal to about 1.21 and less than or equal to about 1.32. Thereby, the phosphor obtained from Example 1-11 may have a uniform particle diameter.

Figure 6:
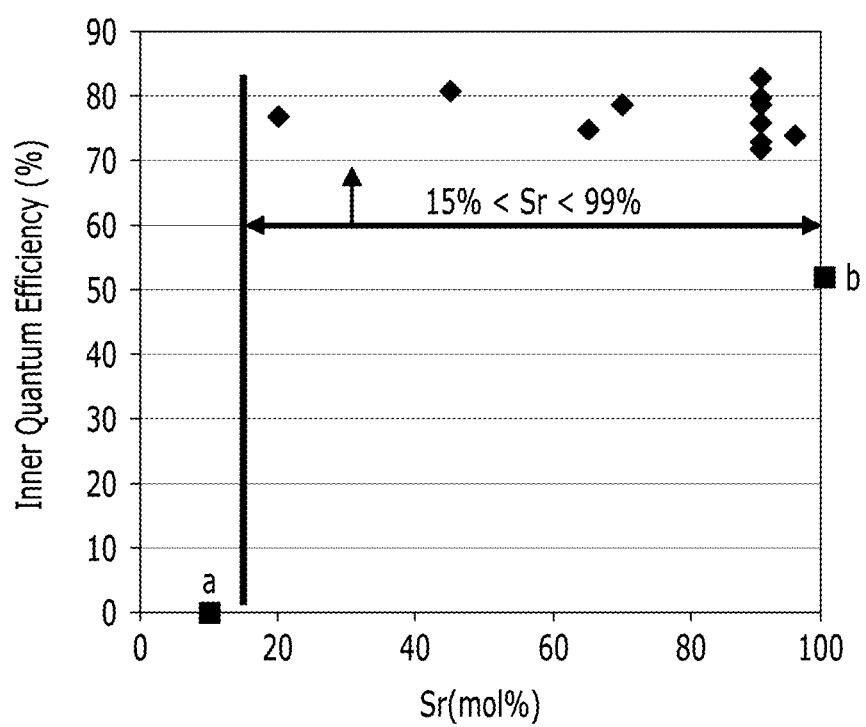
FIG. 6 is a graph showing a relationship between Sr content in a phosphor and inner quantum efficiency at an excitation wavelength of 450 nm.

FIG. 6 is a graph showing a relationship between a Sr content in a phosphor and inner quantum efficiency at an excitation wavelength of 450 nm.

In FIG. 6, the horizontal axis represents Sr content in a phosphor, and the vertical axis represents inner quantum efficiency of the phosphor at an excitation wavelength of 450 nm.

In FIG. 6, the diamond-shaped points indicate Examples 1-11, and the square-shaped points a and b indicate Comparative Examples 6 and 7, respectively.

As shown in FIG. 6, Comparative Example 6 includes a high amount of Ca and less than about 15 mol % of Sr, based on the total amount of an alkaline-earth metal element (Sr, Ca) and Eu. Thereby, the fusing point of the oxynitride synthesized during the firing is lowered, so a phosphor may not be obtained.

It is considered that the inner quantum efficiency at an excitation wavelength of 450 nm is deteriorated since the synthesis reaction is hardly performed by lowering the firing temperature, and more impurities such as a silicon-containing compound are generated.

In addition, in the phosphor according to Comparative Example 7, the Sr content is greater than 99 mol %. Thereby, the Eu content is decreased, and the inner quantum efficiency at an excitation wavelength of 450 nm is deteriorated.

Accordingly, the Sr content is desirably greater than or equal to about 15 mol % and less than or equal to about 99 mol %.

In addition, the phosphors according to Examples 1-11, having the inner quantum efficiency of greater than or equal to about 60% at an excitation wavelength of 450 nm, include Sr at greater than or equal to about 20 mol % and less than or equal to about 95 mol % based on the total amount of an alkaline-earth metal element (Sr, Ca) and Eu. Accordingly, more desirably, the Sr content is greater than or equal to about 20 mol % and less than or equal to about 95 mol %.

Figure 7:
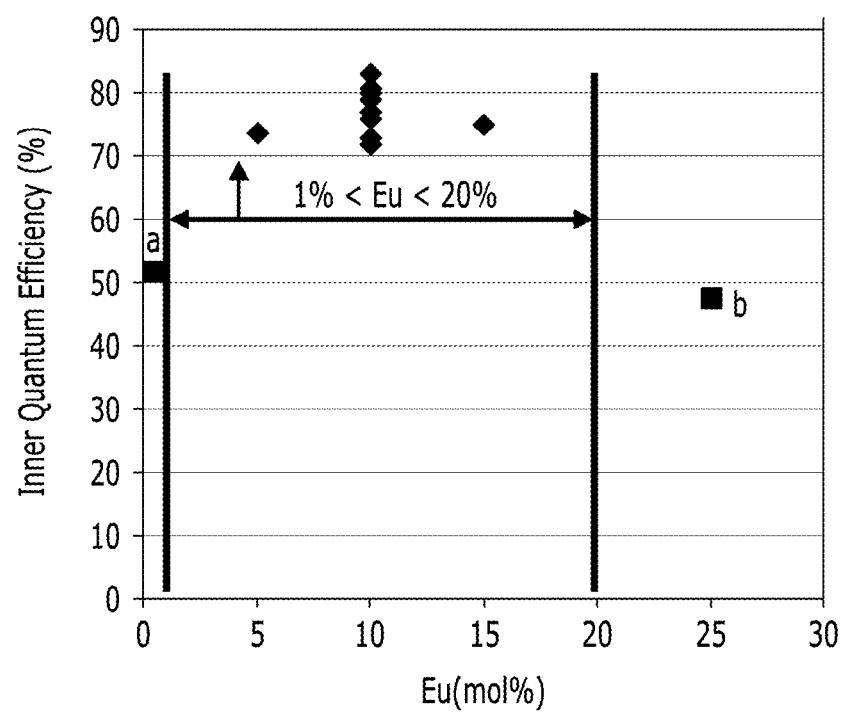
FIG. 7 is a graph showing a relationship between Eu content in a phosphor and inner quantum efficiency at an excitation wavelength of 450 nm.

FIG. 7 is a graph showing a relationship of between Eu content in a phosphor and inner quantum efficiency at an excitation wavelength of 450 nm.

In FIG. 7, the horizontal axis represents Eu content in a phosphor; and the vertical axis represents inner quantum efficiency of the phosphor at an excitation wavelength of 450 nm.

In FIG. 7, the diamond-shaped points indicate Examples 1-11, and the square-shaped points a and b indicate Comparative Example 7 and 8, respectively.

As shown in FIG. 7, the phosphor according to Comparative Example 7 includes Eu at less than about 1 mol % based on the total amount of an alkaline-earth metal element (Sr, Ca) and Eu. Thereby, it has a low Eu content so it deteriorates the inner quantum efficiency at an excitation wavelength of 450 nm.

In addition, in the phosphor according to Comparative Example 8, the Eu content is greater than about 20 mol %. Thereby, the concentration is quenched, and the inner quantum efficiency at an excitation wavelength of 450 nm is deteriorated.

Accordingly, the Eu content is desirably greater than or equal to about 1 mol % and less than or equal to about 20 mol %.

In addition, the phosphors according to Examples 1-11, having the inner quantum efficiency of greater than or equal to about 60% at an excitation wavelength of 450 nm, include Eu at greater than or equal to about 5 mol % and less than or equal to about 15 mol % based on the total amount of an alkaline-earth metal element (Sr, Ca) and Eu. Accordingly, more desirably, the Eu content is greater than or equal to about 5 mol % and less than or equal to about 15 mol %.

Figure 8:
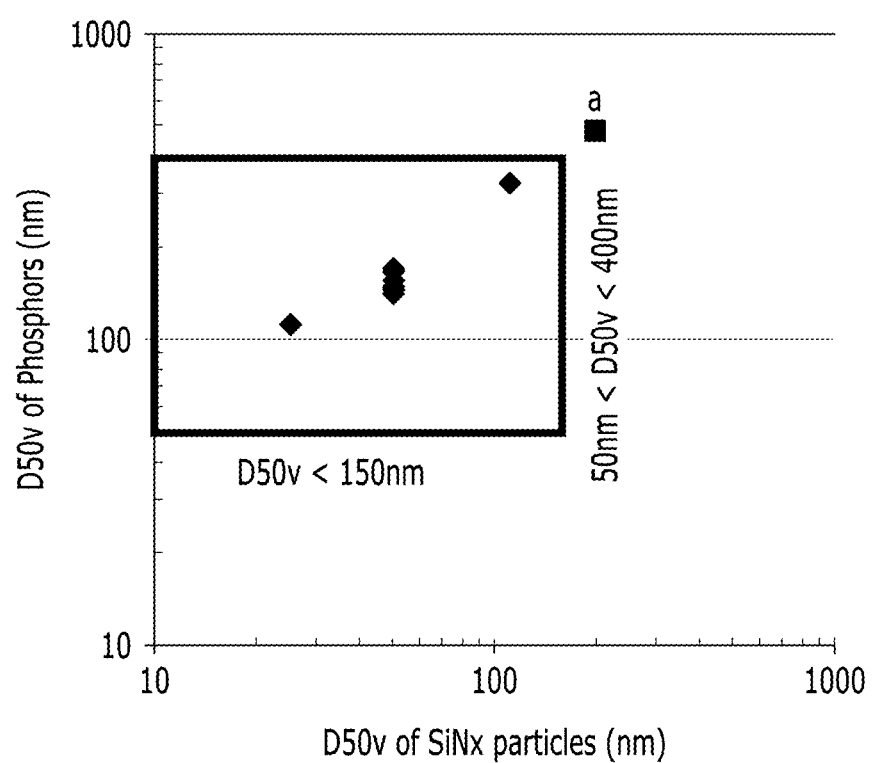
FIG. 8 is a graph showing a relationship between a volume average particle diameter of silicon nitride particles and a volume average particle diameter of a phosphor.

FIG. 8 is a graph showing a relationship between the volume average particle diameter D50V of silicon nitride particles and the volume average particle diameter D50V of a phosphor.

In FIG. 8, the horizontal axis represents the volume average particle diameter D50V of silicon nitride particles, and the vertical axis represents the volume average particle diameter D50V of a phosphor.

Figure 9:
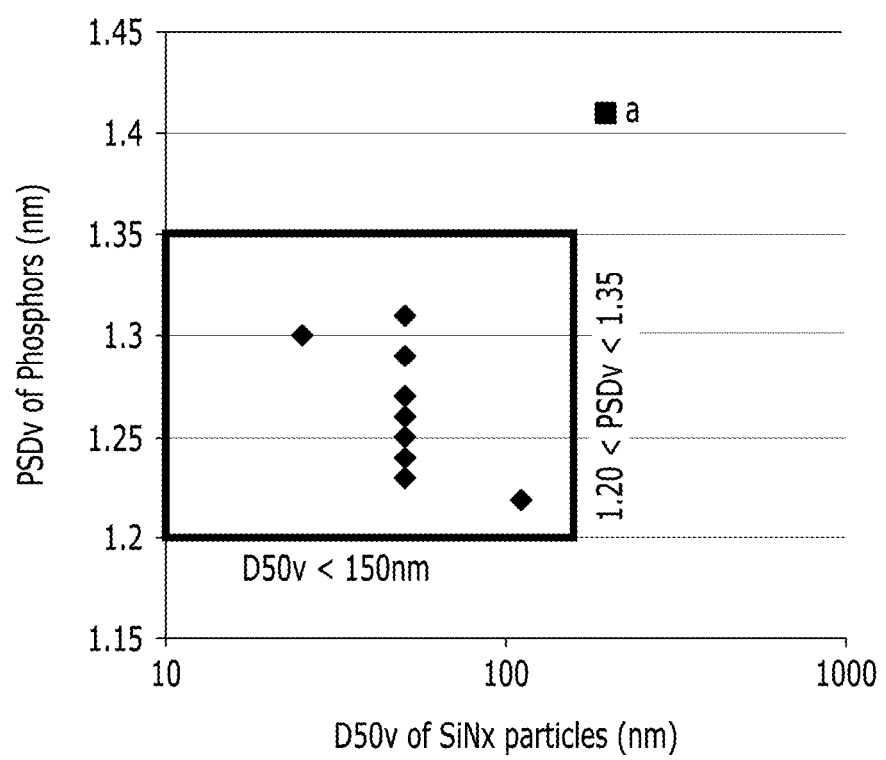
FIG. 9 is a graph showing a relationship between a volume average particle diameter of silicon nitride particles and a volume average particle-size distribution index of a phosphor.

FIG. 9 is a graph showing a relationship between the volume average particle diameter D50V of silicon nitride particles and the volume average particle-size distribution index PSDV of the phosphor.

In FIG. 9, the horizontal axis represents the volume average particle diameter D50V of silicon nitride particles, and the vertical axis represents the volume average particle-size distribution index PSDV of the phosphor.

In FIG. 8 and FIG. 9, the diamond-shaped points indicate Examples 1-11, and the square-shaped points a indicates Comparative Example 1.

As shown in FIG. 8, in Comparative Example 1, the silicon nitride particles have a volume average particle diameter D50V of greater than about 150 nm. Thereby, the volume average particle diameter D50V of phosphor precursor particles is increased. As a result, the volume average particle diameter D50V of the phosphor is increased to greater than 400 nm, so the phosphor having the desirable particle diameter is not obtained.

In addition, as shown in FIG. 9, the particle-size distribution may not be controlled, so the volume average particle-size distribution index PSDV of the phosphor is higher than 1.35, such that the phosphor having the desirable particle-size distribution may not be obtained.

Accordingly, the volume average particle diameter D50V of the silicon nitride particles is desirably less than or equal to about 150 nm. In addition, in Examples 1-11 providing phosphors having the volume average particle diameter D50V of greater than or equal to about 50 nm and less than or equal to about 400 nm and the volume average particle-size distribution index PSDV of greater than or equal to about 1.20 and less than or equal to about 1.35, the volume average particle diameter D50V of the silicon nitride particles is less than or equal to about 120 nm. Accordingly, more desirably, the volume average particle diameter D50V of the silicon nitride particles is less than or equal to about 120 nm.

Figure 10:
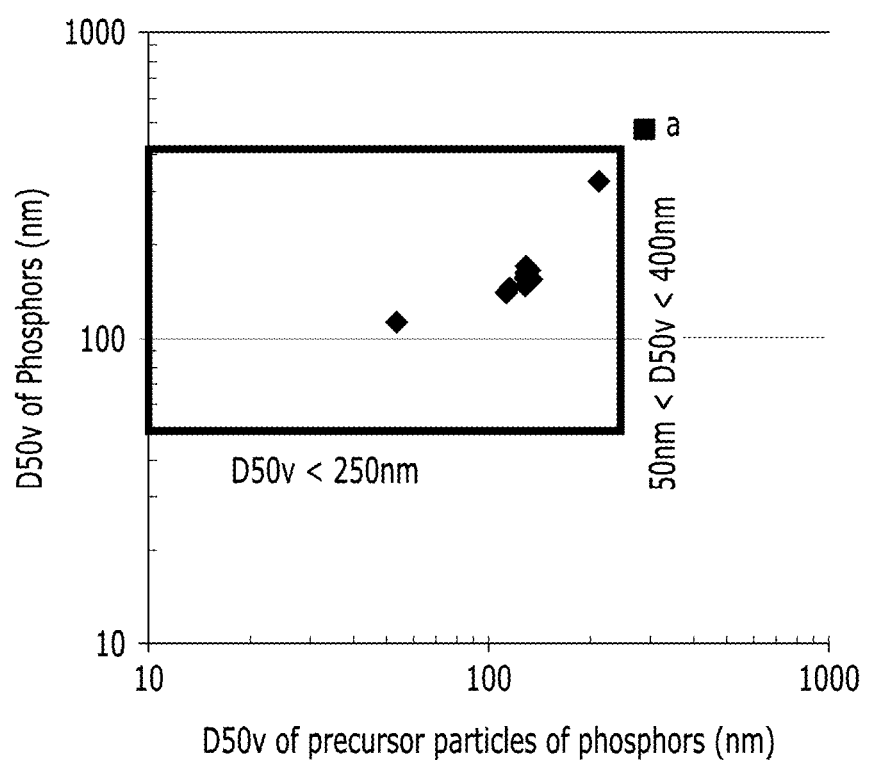
FIG. 10 is a graph showing a relationship between a volume average particle diameter of phosphor precursor particles and a volume average particle diameter of a phosphor.

FIG. 10 is a graph showing a relationship between the volume average particle diameter D50V of the phosphor precursor particles and the volume average particle diameter D50V of the phosphor.

In FIG. 10, the horizontal axis represents a volume average particle diameter D50V of the phosphor precursor particles, and the vertical axis represents a volume average particle diameter D50V of the phosphor.

Figure 11:
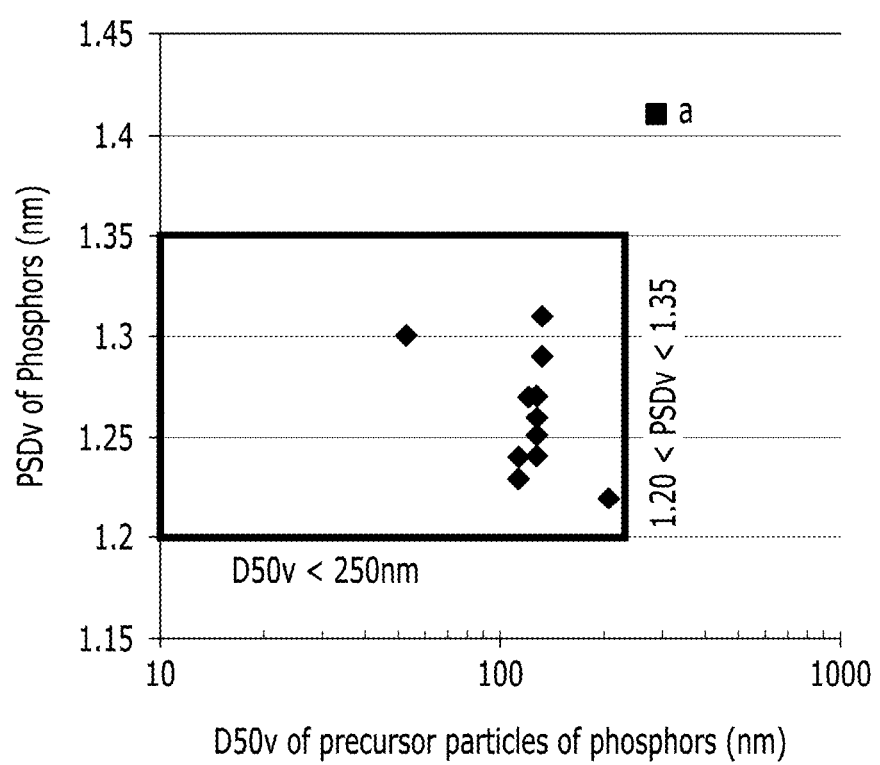
FIG. 11 is a graph showing a relationship between a volume average particle diameter of phosphor precursor particles and a volume average particle-size distribution index of a phosphor.

FIG. 11 is a graph showing a relationship between the volume average particle diameter D50V of the phosphor precursor particles and the volume average particle-size distribution index PSDV of the phosphor.

In FIG. 11, the horizontal axis represents a volume average particle diameter D50V of the phosphor precursor particles, and the vertical axis represents a volume average particle-size distribution index PSDV of the phosphor.

In FIG. 10 and FIG. 11, the diamond-shaped points indicate Examples 1-11, and the square-shaped point a indicates Comparative Example 1.

As shown in FIG. 10, the volume average particle diameter D50V of the phosphor precursor particles according to Comparative Example 1 is greater than about 250 nm. Thereby, the volume average particle diameter D50V of the phosphor is increased to greater than about 400 nm, so the phosphor having the desirable particle diameter may not be obtained.

In addition, as shown in FIG. 11, the particle-size distribution may not be controlled, so the volume average particle-size distribution index PSDV of the phosphor is greater than about 1.35, such that the phosphor having the desirable particle-size distribution may not be obtained.

Accordingly, the volume average particle diameter D50V of the phosphor precursor particles may be desirably less than or equal to about 250 nm. In addition, in Examples 1-11 providing phosphor having the volume average particle diameter D50V of greater than or equal to about 50 nm and less than or equal to about 400 nm and the volume average particle-size distribution index PSDV of greater than or equal to about 1.20 and less than or equal to about 1.35, the volume average particle diameter D50V of the phosphor precursor particles is less than or equal to about 210 nm. Accordingly, more desirably, the volume average particle diameter D50V of the phosphor precursor particles is less than or equal to about 210 nm.

Figure 12:
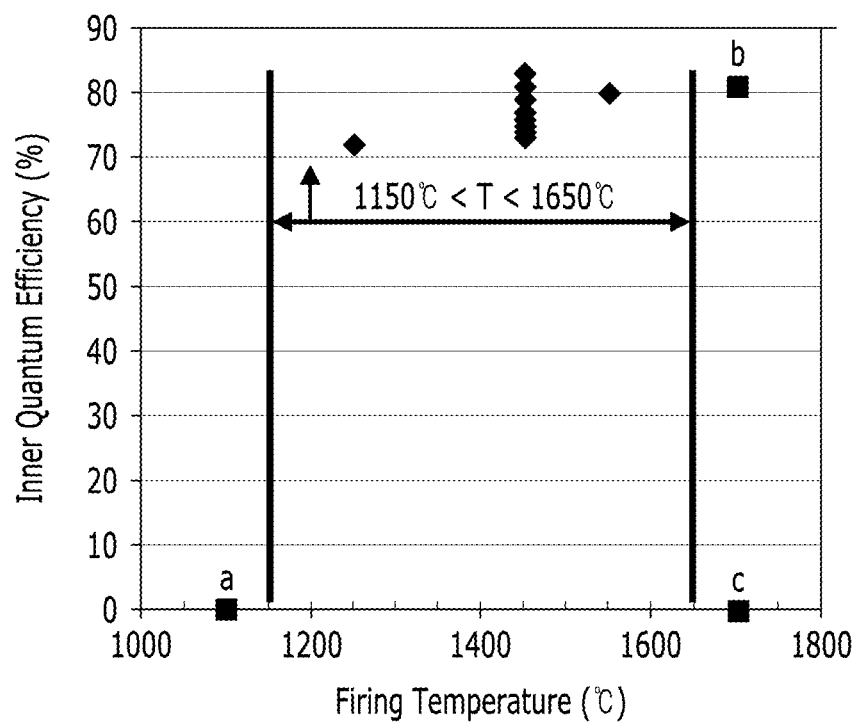
FIG. 12 is a graph showing a relationship between a firing temperature and inner quantum efficiency at an excitation wavelength of 450 nm.

FIG. 12 is a graph showing a relationship between the firing temperature and the inner quantum efficiency of a phosphor at an excitation wavelength of 450 nm.

In FIG. 12, the horizontal axis represents a firing temperature, and the vertical axis represents inner quantum efficiency of a phosphor at an excitation wavelength of 450 nm.

In FIG. 12, the diamond-shaped points indicate Examples 1-11, and the square-shaped points a-c indicate Comparative Examples 3-5.

Figure 13:
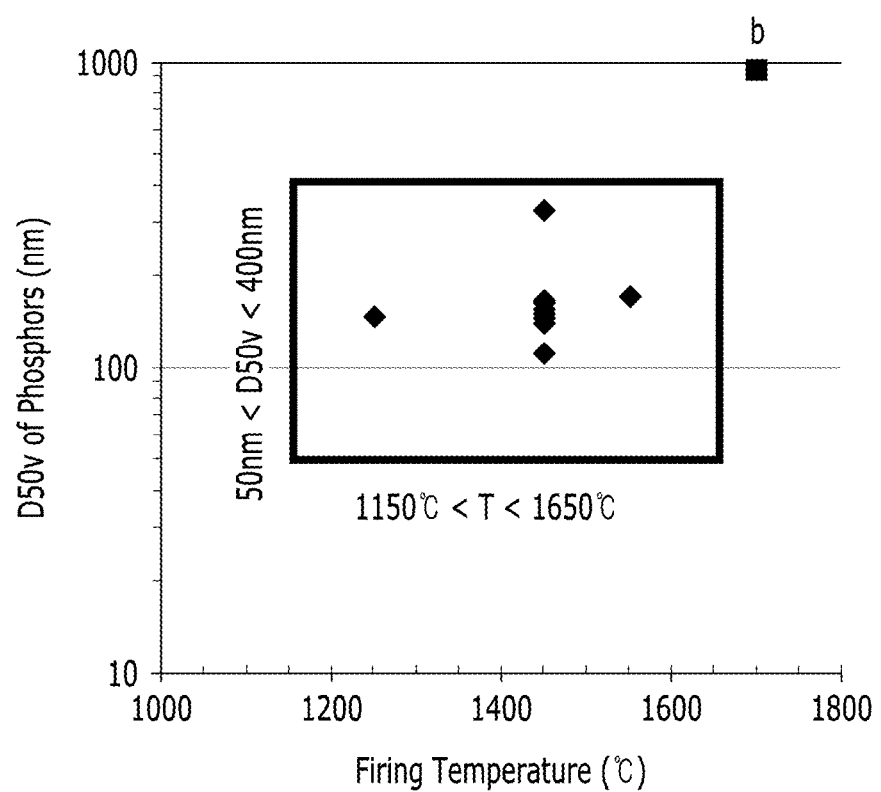
FIG. 13 is a graph showing a relationship between a firing temperature and a volume average particle diameter of a phosphor.

FIG. 13 is a graph showing a relationship between the firing temperature and the volume average particle diameter D50V of a phosphor.

In FIG. 13, the horizontal axis represents a firing temperature, and the vertical axis represents a volume average particle diameter D50V of a phosphor.

Figure 14:
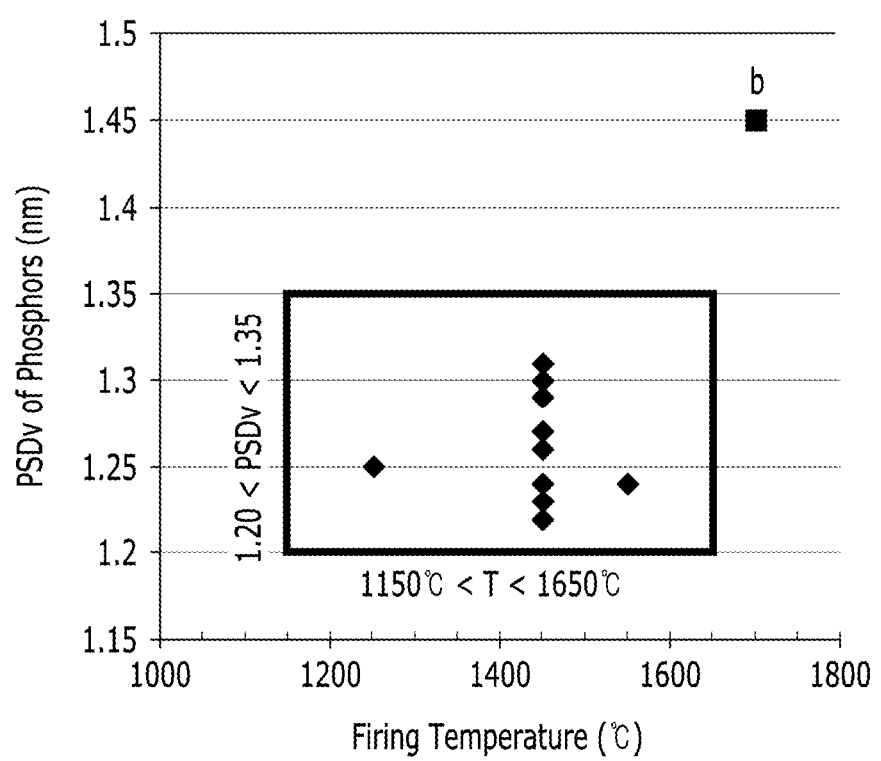
FIG. 14 is a graph showing a relationship between a firing temperature and a volume average particle-size distribution index of a phosphor.

FIG. 14 is a graph showing a relationship of between the firing temperature and the volume average particle-size distribution index PSDV of a phosphor.

In FIG. 14, the horizontal axis represents a firing temperature, and the vertical axis represents a volume average particle-size distribution index PSDV of a phosphor.

In FIG. 13 and FIG. 14, the diamond-shaped points indicate Examples 1-11, and the square-shaped point b indicates Comparative Example 4.

As shown in FIG. 12, in Comparative Example 3, the firing temperature is lower than about 1150° C. Thereby, the phosphor is not obtained since the synthesis reaction is not performed, and the firing is insufficient. In addition, it is considered that the inner quantum efficiency at an excitation wavelength of 450 nm is deteriorated because the synthesis reaction is not performed by the low firing temperature, and the impurities such as a silicon-containing compound are increased.

In addition, as shown in FIG. 12, the firing temperature is higher than 1650° C. in Comparative Example 4. Thereby, as shown in FIG. 13, the particle growth is excessively performed, and the volume average particle diameter D50V of the phosphor is increased to greater than 400 nm, so that phosphor having the desirable particle diameter may not be obtained.

In addition, as shown in FIG. 14, the particle-size distribution may not be controlled, and the volume average particle-size distribution index PSDV of the phosphor is greater than 1.35, so a phosphor having the desirable particle-size distribution may not be obtained.

As shown in FIG. 12, the firing temperature is higher than 1650° C. in Comparative Example 5. In Comparative Example 5, as the fusing point of the oxynitride synthesized during the firing is lowered depending upon the content ratio of an alkaline-earth metal element (Sr, Ca) and Eu, the oxynitride is fused at the high firing temperature to not provide a phosphor.

Accordingly, the firing temperature is desirably greater than or equal to about 1150° C. and less than or equal to about 1650° C.

In the phosphors according to Examples 1-11 having a volume average particle diameter D50V of greater than or equal to about 50 nm and less than or equal to about 400 nm and a volume average particle-size distribution index PSDV of greater than or equal to about 1.20 and less than or equal to about 1.35, the firing temperature is greater than or equal to about 1200° C. and less than or equal to about 1600° C. Accordingly, more desirably, the firing temperature is greater than or equal to about 1200° C. and less than or equal to about 1600° C.

In Examples 1-11, the phosphor precursor particles are fired under a mixed gas atmosphere of hydrogen and nitrogen or a mixed gas atmosphere of ammonia and nitrogen. In this case, a phosphor including a main component of the oxynitride is obtained.

Specifically, phosphors according to Examples 1-11 include the oxynitride at greater than or equal to about 50 mass %, and more specifically, at greater than or equal to about 70 mass %, based on the total amount of oxynitride and the silicon-containing compound. By including the oxynitride as a main component, a phosphor having high inner quantum efficiency at an excitation wavelength of 450 nm is obtained.

On the other hand, in Comparative Example 2, the phosphor precursor particles are fired under a gas atmosphere of 100 volume % of nitrogen. In this case, the synthesis reaction of the oxynitride is not performed, but a silicon-containing compound including a crystal structure of $Sr_2SiO_4$ is generated as a main component.

Accordingly, the firing is desirably performed under a mixed gas atmosphere of hydrogen and nitrogen or a mixed gas atmosphere of ammonia and nitrogen.

Although the examples illustrate using a combination of Sr and Ca as the alkaline-earth metal element as well as using only Sr, the present invention may be applied using at least one of Ba and Mg instead of Ca, or using at least one of Ba and Mg together with Ca.

In addition, only Eu is used as the activator element in the above examples, but this disclosure may be applied to using Ce together with Eu.

Further, only a co-precipitation method as the wet chemical method is described in the above examples, but this disclosure may be applied to a citrate process.

In the above examples, the carbonate of an alkaline-earth metal element and the hydroxide of an activator element are deposited on the surface of silicon nitride particles is described, but this disclosure may be applied to hydrogen carbonate, a phosphate, a carboxylate salt, an oxalate, a sulfate, or an organometallic compound instead of the carbonate or the hydroxide being deposited.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A phosphor comprising:
    at least one of a nitride and an oxynitride, wherein the nitride and the oxynitride comprise an alkaline-earth metal element, silicon and an activator element, and
    less than 50 mass % of a silicon-comprising compound having a different crystal structure than the oxynitride,
    wherein the oxynitride is represented by a formula of $MSi_2O_2N_2$, and has a crystal structure of $SrSi_2O_2N_2$, and
    wherein the element M comprises at least one alkaline-earth metal element comprising at least Sr and an additional alkaline-earth metal selected from Ca, Ba and Mg and at least one activator element comprising at least Eu or a combination of Eu and Ce, and
    M comprises Sr at greater than or equal to about 15 mol % and less than or equal to about 99 mol % and the activator element at greater than or equal to about 1 mol % and less than or equal to about 20 mol % based on a total amount of the M element.

2. The phosphor of claim 1, wherein the phosphor has
    a volume average particle diameter of greater than or equal to about 50 nm and less than or equal to about 400 nm, and
    an inner quantum efficiency of greater than or equal to about 60% at an excitation wavelength of about 450 nm.

3. The phosphor of claim 1, having a volume average particle-size distribution index of greater than or equal to about 1.20 and less than or equal to about 1.35.

4. A method of preparing a phosphor, the method comprising:
    a precursor preparation process comprising preparing phosphor precursor particles comprising silicon nitride particles, a compound comprising an alkaline-earth metal element, and a compound comprising an activator element, wherein the compound comprising the alkaline-earth metal element and the compound comprising the activator element are deposited on a surface of the silicon nitride particles, and further wherein the phosphor precursor particles have a volume average particle diameter of less than or equal to about 250 nm; and
    a firing process comprising firing the phosphor precursor particles,
    wherein the phosphor comprises at least one of a nitride and an oxynitride, wherein the nitride and the oxynitride consist essentially of the alkaline-earth metal element, silicon, and the activator element.

5. The method of claim 4, wherein the precursor preparation process further comprises providing: a suspension comprising the silicon nitride particles, a material comprising the alkaline-earth metal element, and a material comprising the activator element; and subjecting the suspension to a wet chemical method to provide the phosphor precursor particles in which the compound comprising the alkaline-earth metal element, and the compound comprising the activator element are mixed with each other and deposited on the surface of the silicon nitride particles.

6. The method of claim 4, wherein the phosphor precursor particles comprise the silicon nitride particles, a compound comprising at least one alkaline-earth metal element comprising at least Sr and an alkaline-earth metal element selected from Ca, Ba and Mg, and a compound comprising at least one activator element comprising Eu or a combination of Eu and Ce, wherein the compound comprising at least one alkaline-earth metal element and the compound comprising at least one activator element are deposited on the surface of the silicon nitride particles in a mole ratio of a total amount of the alkaline-earth metal element and the activator element to the silicon of about 1:1.4 to about 1:2.86, and the phosphor precursor particles comprises Sr at greater than or equal to about 15 mol % and less than or equal to about 99 mol % and the activator element at greater than or equal to about 1 mol % and less than or equal to about 20 mol % based on a total amount of the M element.

7. The method of claim 6, wherein the precursor preparation process further comprises:

a suspension forming process comprising a suspension comprising silicon nitride particles, a material comprising at least one alkaline-earth metal element comprising at least Sr and an alkaline-earth metal element selected from Ca, Ba and Mg, and a material comprising at least one activator element comprising Eu or a combination of Eu and Ce, to provide a mole ratio of a total amount of the alkaline-earth metal element and the activator element to the silicon of about 1:1.4 to about 1:2.86, and a precursor forming process comprising subjecting the suspension to a wet chemical method to precipitate the compound comprising the alkaline-earth metal and the compound comprising the activator element and to provide phosphor precursor particles in which the compound comprising the alkaline-earth metal and the compound comprising the activator element are mixed with each other and deposed on the surface of the silicon nitride particles, wherein the suspension comprises Sr at greater than or equal to about 15 mol % and less than or equal to about 99 mol % and the activator element at greater than or equal to about 1 mol % and less than or equal to about 20 mol % based on a total amount of the M element.

8. The method of claim 5, wherein the wet chemical method is at least one of a co-precipitation method and a citrate process.

9. The method of claim 8, wherein the wet chemical method is a co-precipitation method.

10. The method of claim 4, wherein each of the compound comprising the alkaline-earth metal element and the compound comprising the activator element comprises at least one selected from a carbonate, a hydrogen carbonate, a phosphate, a carboxylate, an oxalate, a sulfate, an organometallic compound, and a hydroxide.

11. The method of claim 10, wherein each of the compound comprising the alkaline-earth metal element and the compound comprising the activator element comprises at least one compound selected from a carbonate and a hydroxide.

12. The method of claim 4, wherein the silicon nitride particles have a volume average particle diameter of less than or equal to about 150 nm.

13. The method of claim 4, wherein the silicon nitride particles are amorphous.

14. The method of claim 4, wherein the firing process is performed under a mixed gas atmosphere of hydrogen and nitrogen or a mixed gas atmosphere of ammonia and nitrogen at a temperature of greater than or equal to about 1150° C. and less than or equal to about 1650° C.

* * * * *